(12) United States Patent
Ogawa et al.

(10) Patent No.: US 10,675,952 B2
(45) Date of Patent: Jun. 9, 2020

(54) WINDING DEVICE

(71) Applicant: HAYASHI TELEMPU CORPORATION, Nagoya-shi, Aichi (JP)

(72) Inventors: Koichi Ogawa, Aichi (JP); Shinnosuke Kawai, Aichi (JP); Ryosuke Yaguchi, Aichi (JP)

(73) Assignee: HAYASHI TELEMPU CORPORATION, Nagoya-shi, Aichi (JP)

( * ) Notice: Subject to any disclaimer, the term of this patent is extended or adjusted under 35 U.S.C. 154(b) by 261 days.

(21) Appl. No.: 15/871,076

(22) Filed: Jan. 15, 2018

(65) Prior Publication Data

US 2018/0154740 A1 Jun. 7, 2018

Related U.S. Application Data

(63) Continuation of application No. PCT/JP2016/068204, filed on Jun. 20, 2016.

(30) Foreign Application Priority Data

Jul. 27, 2015 (JP) ................................. 2015-148082

(51) Int. Cl.
*B60J 1/20* (2006.01)
*E06B 9/66* (2006.01)
(Continued)

(52) U.S. Cl.
CPC ........... *B60J 1/2025* (2013.01); *B60J 1/2016* (2013.01); *B60J 1/2036* (2013.01); *B60J 1/2038* (2013.01);
(Continued)

(58) Field of Classification Search
CPC ...... E06B 9/50; E06B 9/60; E06B 9/66; B60J 1/2025; B60J 1/2063; B60J 1/2038;
(Continued)

(56) References Cited

U.S. PATENT DOCUMENTS 154,400 A * 8/1874 Knapp ...................... E06B 9/90
160/299
194,073 A * 8/1877 Connelly .................. E06B 9/50
160/298
(Continued)

FOREIGN PATENT DOCUMENTS

JP H04-62790 U 5/1992
JP H06-330682 A 11/1994
(Continued)

OTHER PUBLICATIONS

International Search Report for PCT/JP2016/068204 dated Aug. 16, 2016.
PCT written opinion dated Aug. 16, 2016.

*Primary Examiner* — Katherine W Mitchell
*Assistant Examiner* — Abe Massad
(74) *Attorney, Agent, or Firm* — Yokoi & Co., U.S.A.; Toshiyuki Yokoi

(57) ABSTRACT

The present invention discloses a winding device includes a screen, a winding shaft for winding the screen, a housing portion for housing the winding shaft, and a fiber assembly that supports rotatably an end portion of the winding shaft. The present invention also discloses a winding device includes a screen, a winding shaft for winding the screen, the winding shaft having an opening at an end portion, a housing portion for housing the winding shaft, a fiber assembly that is in the opening of the winding shaft, the fiber assembly having a hole along a center line direction of the winding shaft, and a support shaft that is in the hole of the fiber (Continued)

assembly, the support shaft supporting the fiber assembly rotatably.

1 Claim, 19 Drawing Sheets

(51) Int. Cl.
    *E06B 9/50*     (2006.01)
    *E06B 9/60*     (2006.01)
    *E06B 9/42*     (2006.01)
    *E04F 10/06*     (2006.01)

(52) U.S. Cl.
    CPC ........... *B60J 1/2063* (2013.01); *B60J 1/2086* (2013.01); *E04F 10/0655* (2013.01); *E06B 9/42* (2013.01); *E06B 9/50* (2013.01); *E06B 9/60* (2013.01); *E06B 9/66* (2013.01)

(58) Field of Classification Search
    CPC ...... B60J 1/2086; B60J 1/2036; B60J 1/2016; E04F 10/0655
    See application file for complete search history.

(56) References Cited

U.S. PATENT DOCUMENTS

| | | | | |
|---|---|---|---|---|
| 212,548 | A * | 2/1879 | Gano | E06B 9/50 160/298 |
| 251,893 | A * | 1/1882 | Kempster | E06B 9/50 160/298 |
| 280,833 | A * | 7/1883 | Kelly | E06B 9/50 160/298 |
| 3,014,767 | A * | 12/1961 | Thrasher | F16C 11/0614 384/203 |
| 3,033,623 | A * | 5/1962 | Thomson | F16C 33/28 384/299 |
| 3,853,170 | A * | 12/1974 | Barettella | A47H 1/102 160/323.1 |
| 7,703,983 | B2 * | 4/2010 | Tsutsui | C08J 9/40 384/276 |
| 2016/0137037 | A1 | 5/2016 | Watanabe et al. | |

FOREIGN PATENT DOCUMENTS

JP         2014-094652 A     5/2014
JP         2015-42505 A      3/2015

* cited by examiner

WINDING DEVICE

CROSS-REFERENCES TO RELATED APPLICATIONS

This Application claims the benefit of priority and is a Continuation application of the prior International Patent Application No. PCT/JP2016/068204, with an international filing date of Jun. 20, 2016, which designated the United States, and is related to the Japanese Patent Application No. 2015-148082, filed Jul. 27, 2015, the entire disclosures of all applications are expressly incorporated by reference in their entirety herein.

BACKGROUND OF THE INVENTION

1. Field of the Invention

The present invention relates to a winding device installed in a vehicle cabin of an automobile or the like.

2. Description of Related Art

A vehicle door, for example, is equipped with a sunshade device for blocking sunlight for the purpose of preventing dazzling and for protecting privacy in the vehicle. In the sunshade device for the vehicle door, in many cases, a shading screen is wound and housed inside a door body when not in use. When in use, the screen is drawn out upward along a window glass and the screen is held at a use position to cover the window glass by, for example, engaging a tip portion of the screen with an engagement portion of the door side.

The sunshade device for the vehicle door has a screen, a winding shaft and a case made of resin, for example. The winding shaft is formed by inserting shaft members made of resin into both ends of a cylindrical body made of aluminum, for example. The shaft member is rotatably supported by a wall portion (rotation support portion) of the case, for example. Japanese Unexamined Patent Application Publication No. 2015-42505 discloses that the shaft member is rotatably supported by the wall portion of the case via a cap made of resin.

When using low-priced synthetic resins such as polypropylene for the case formed by the resin material, since the linear expansion coefficient of the case is larger than the linear expansion coefficient of alminium, it is necessary to consider variation in dimension of the case caused by change in temperature. When a clearance is formed between the shaft member of the winding shaft and the rotation support portion of the case as a result of considering the variation in the dimension, abnormal noise may occur when vibration is applied to the winding device or when the winding shaft is rotated. If a special material is used for the case to reduce the linear expansion coefficient, the resin material for forming the case becomes expensive.

Note that the above described problems can also occur in a tonneau cover device and other winding devices other than the sunshade device.

BRIEF SUMMARY OF THE INVENTION

The present invention discloses a winding device capable of reducing the abnormal noise when vibration is input or when the winding shaft is rotated.

One aspect of the present invention provides a winding device, comprising:

a screen;
a winding shaft for winding the screen;
a housing portion for housing the winding shaft; and
a fiber assembly that supports rotatably an end portion of the winding shaft.

Another aspect of the present invention provides a winding device, comprising:

a screen;
a winding shaft for winding the screen, the winding shaft having an opening at an end portion;
a housing portion for housing the winding shaft;
a fiber assembly that is in the opening of the winding shaft, the fiber assembly having a hole along a center line direction of the winding shaft; and
a support shaft that is in the hole of the fiber assembly, the support shaft supporting the fiber assembly rotatably.

DETAILED DESCRIPTION OF THE INVENTION

Figure 1:
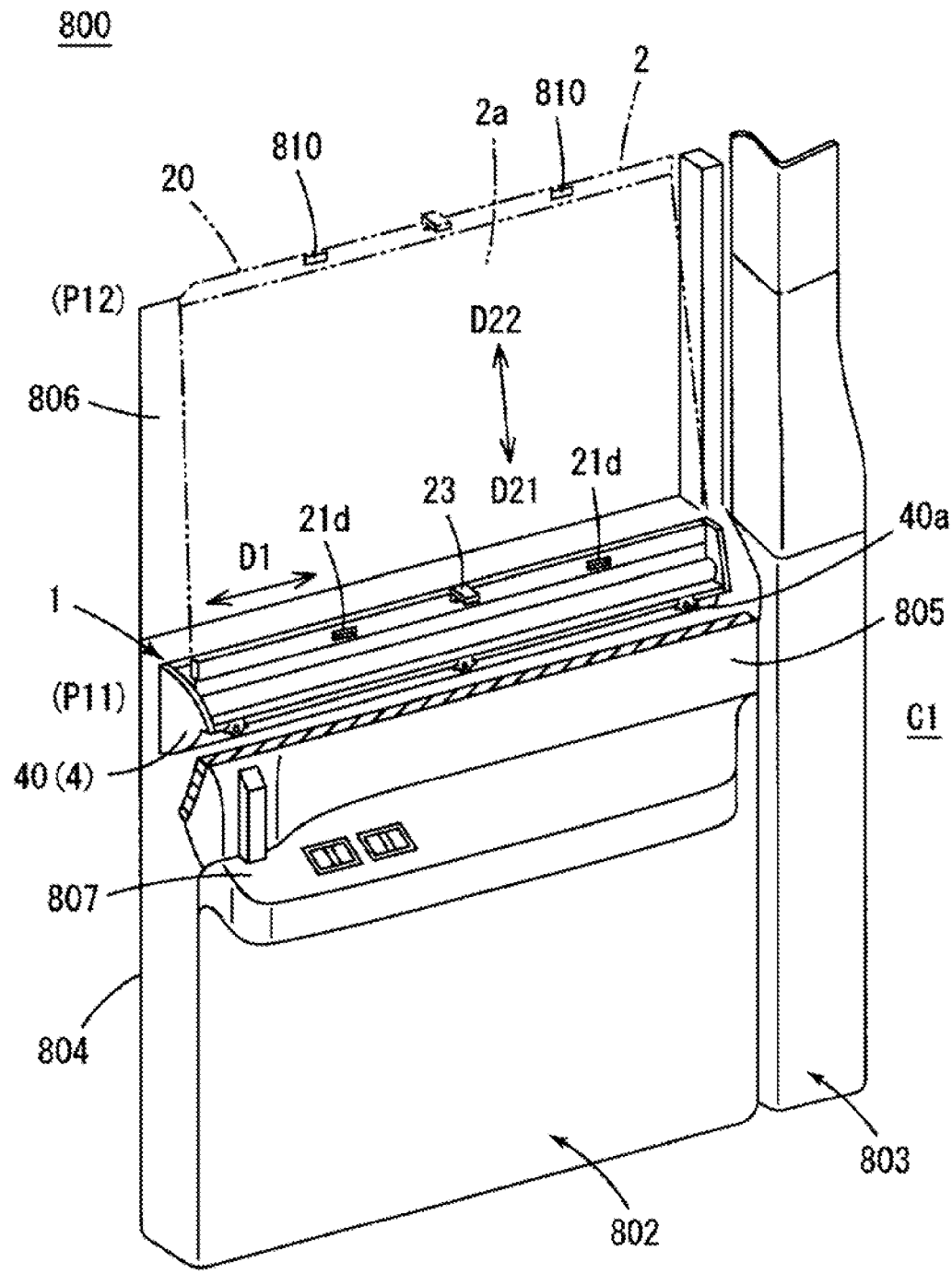
FIG. 1 is a perspective view schematically showing an example of a vehicle door to which a winding device is assembled, viewed from a vehicle cabin side.

Hereafter, embodiments of the present invention will be explained. Of course, the below-described embodiments merely exemplify the present invention. All features disclosed in the embodiments are not necessarily essential for the present invention to solve the problems.

(1) Outline of Present Technology

First, with reference to FIGS. 1 to 19, an outline of the technology included in the present invention will be explained. Note that FIGS. 1 to 19 are figures for schematically showing examples and therefore magnification ratios of each direction shown in the figures may be different and each of the figures may not fit together.

Embodiment 1

A winding device 1 concerning one embodiment of the present technology includes a screen 2, a winding shaft 3 for winding the screen 2, a housing portion 4 for housing the winding shaft 3, and a fiber assembly 5 that supports rotatably an end portion (e.g., a projecting portion 3b) of the winding shaft 3. Since the end portion (3b) of the winding shaft 3 is supported rotatably by the fiber assembly 5, vibration applied to the winding device 1 is absorbed by the fiber assembly 5 even in consideration of a variation in the dimension of the housing portion 4 due to changes in temperature. Thus, abnormal noise is suppressed. Accordingly, the present embodiment can suppress generation of abnormal noise when vibration is input or when the winding shaft is rotated.

Here, the screen is a concept including a shade, a blind, a sheet and the like. The screen can be any screen as long as it blocks at least a part of transmitted light. The screen is not limited to the purpose of sun shading. The screen includes a screen having a mesh and a sheet without having a mesh, for example. Specifically, the screen includes a sunshade, a tonneau cover and the like.

The fiber assembly means an object in which fibers assemble. The fiber assembly can be formed only by fibers although the fiber assembly can include materials other than fibers.

Embodiment 2

The winding shaft 3 can include a body portion 3a to which one end (e.g., a base edge 2b) of the screen 2 is fixed, and a projecting portion 3b that protrudes in a center line direction D1 of the winding shaft 3 from an end face 3a1 of the body portion 3a in the center line direction D1, the projecting portion 3b being supported rotatably by the fiber assembly 5. Here, the end face in the center line direction means the face located at an end in the center line direction and crossing the center line direction (e.g., orthogonal face). The projecting portion means a projected portion. The projecting portion includes a protruded portion, an expanded (expandingly projected) portion and the like. The winding device 1 can further include a retention structure 6 that keeps the fiber assembly 5 apart from the end face 3a1 of the body portion 3a. Since the fiber assembly 5 that supports rotatably the projecting portion 3b of the winding shaft 3 is kept apart from the end face 3a1 of the body portion 3a of the winding shaft, the present embodiment can suppress rotational resistance caused when the fiber assembly is in contact with the end face of the body portion of the winding shaft.

Note that the winding device without the projecting portion is also included in the present technology.

Embodiment 3

The retention structure 6 can include a wall portion 61 arranged between the end face 3a1 of the body portion 3a and the fiber assembly 5 in the center line direction D1, the wall portion 61 having a formed through hole 62 that allows the projecting portion 3b of the winding shaft 3 through. The above described embodiment can prevent the rotational resistance caused when the fiber assembly is in contact with the end face of the body portion of the winding shaft by a simple structure. Even if the through hole on the wall portion is large enough to allow the winding shaft through, the wall portion is arranged between the end face of the body portion and the fiber assembly in the center line direction.

The wall portion 61 can be formed either on the housing portion 4 or on the part other than the housing portion 4.

Embodiment 4

Figure 13:
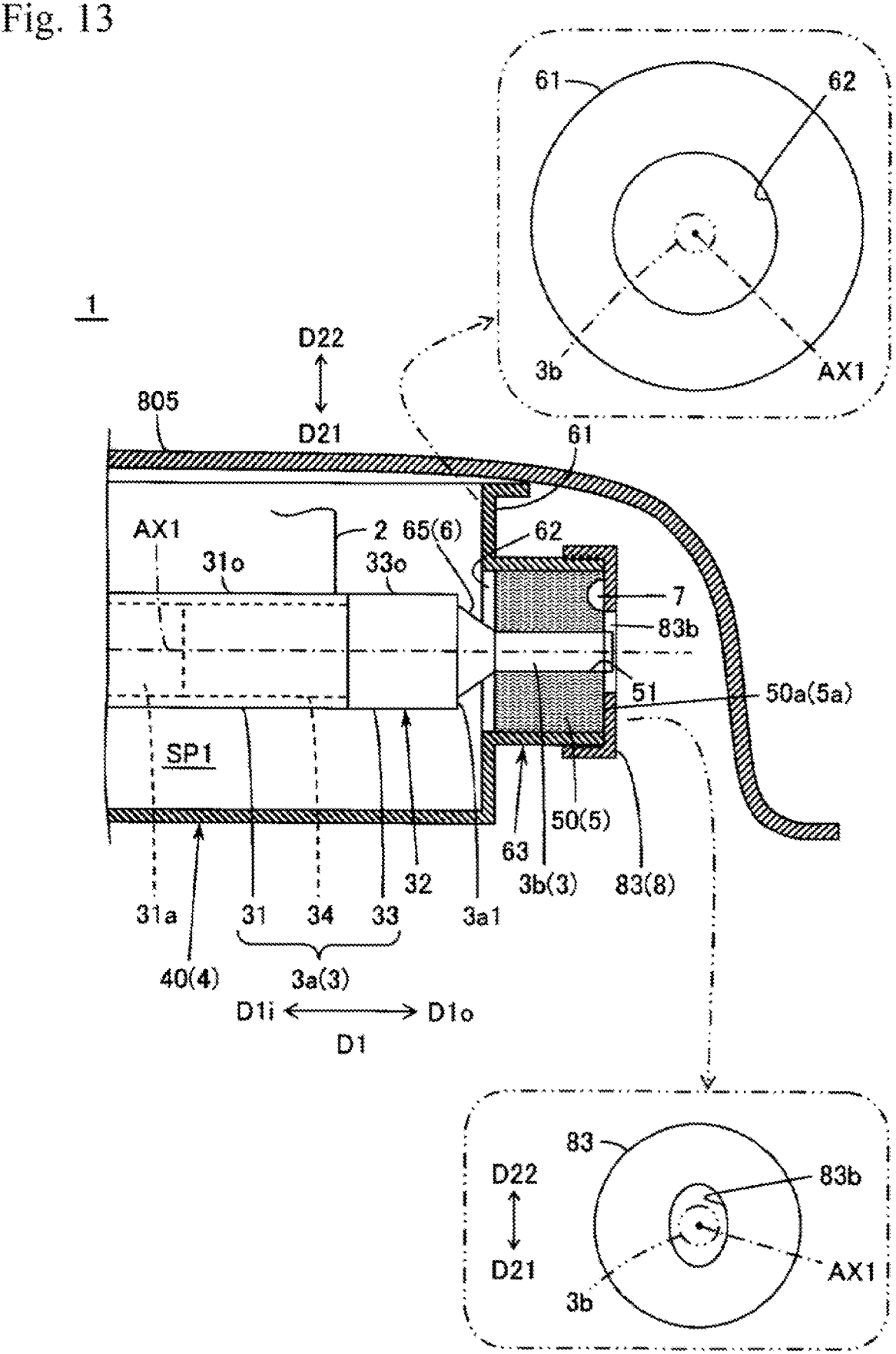
FIG. 13 is a vertical cross-sectional view schematically showing an example of the winding device having a projecting portion on which an enlarged portion is formed.

As exemplified in FIG. 13, the retention structure 6 can include a formed enlarged portion 65 on the projecting portion 3b, the enlarged portion 65 being arranged between the end face 3a1 of the body portion 3a and the fiber assembly 5 in the center line direction D1. The above described embodiment can prevent the rotational resistance caused when the fiber assembly touches the end face of the body portion of the winding shaft by a simple structure, the formed enlarged portion on the projecting portion.

The enlarged portion includes a tapered shape in which the diameter is gradually increased from the fiber assembly to the end face of the body portion, for example.

Embodiment 5

The winding device 1 can further include a structure (e.g., prevention structure 8) that prevents the fiber assembly 5 from shifting from the winding shaft 3 toward an outside D1o in the center line direction D1 of the winding shaft 3. The above described embodiment can prevent the fiber assembly 5 from being displaced from the winding shaft 3 toward the outside D1o in the center line direction D1.

The above described structure (8) includes a lid portion (e.g., a lid portion 80 shown in FIG. 4) connected to a fiber assembly housing portion for housing the fiber assembly by a hinge structure, and a separately formed lid (e.g., a lid 83 shown in FIG. 10 and a cap 180 shown in FIG. 16) fitted to the fiber assembly housing portion, for example.

Note that the winding device without the structure (8) is also included in the present technology.

Embodiment 6

The winding device 1 can include a protrusion 7 that protrudes toward the fiber assembly 5 side from an end face 5a of the fiber assembly 5 in the center line direction D1 of the winding shaft 3. The protrusion includes an expanded portion, a protruded portion and the like. The above described embodiment can further increase the durability since rigidity of the fiber assembly 5 is increased.

The protrusion 7 can be formed on the above described structure (8), the wall portion 61 on which the through hole 62 that allows the projecting portion 3b of the winding shaft 3 through is formed, or other portions.

Embodiment 7

Figure 6A:
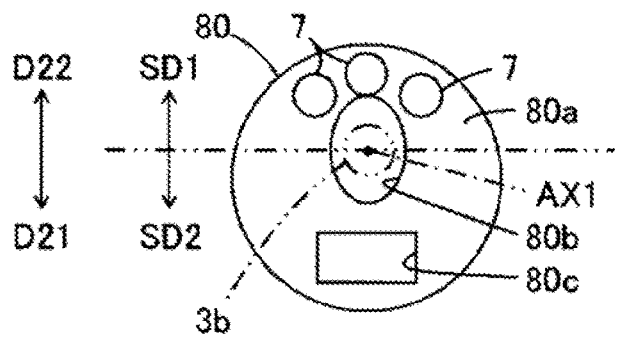
FIG. 6A is a drawing schematically showing an arrangement example of protrusions with respect to a lid portion.
Figure 6B:
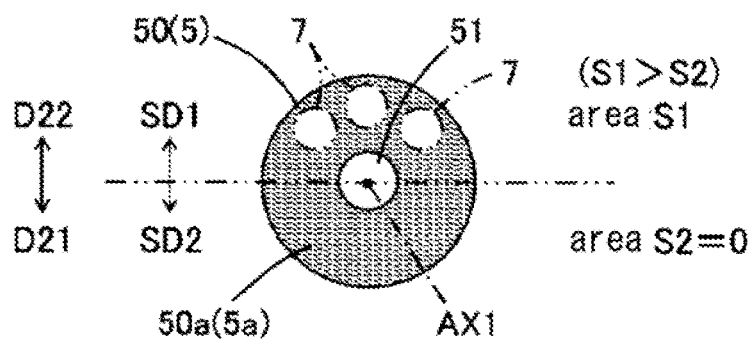
FIGS. 6B to 6D are drawings schematically showing arrangement examples of the protrusions with respect to a fiber assembly.
Figure 6C:
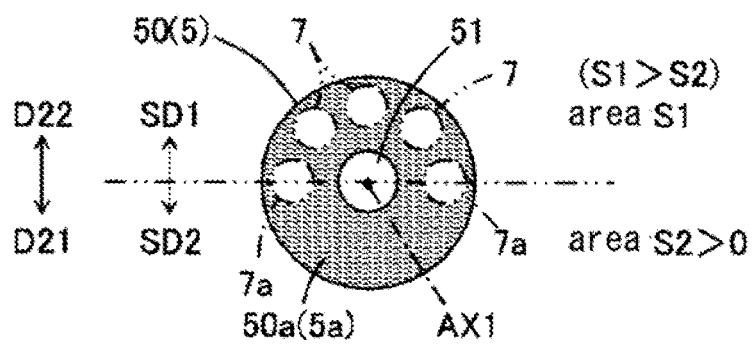

As exemplified in FIGS. 6B and 6C, in the end face 5a of the fiber assembly 5 in the center line direction D1, an area S1 where the protrusion 7 protrudes toward the fiber assembly 5 side on a side SD1 of drawing out the screen 2 from a center line AX1 of the winding shaft 3 can be larger than an area S2 where the protrusion 7 protrudes toward the fiber assembly 5 side on an opposite side SD2 to the side SD1 of drawing out the screen 2 from the center line AX1 of the winding shaft 3. Note that the side of drawing out the screen is also referred to as a screen-drawing-out side and the opposite side to the side of drawing out the screen is also referred to as a screen-drawing-in side. When the screen 2 is drawn out from the housing portion 4 repeatedly, the fiber assembly 5 tends to be more easily collapsed at the portion of the screen-drawing-out side SD1 than the portion of the screen-drawing-in side SD2. The above described embodiment can provide an easily assembled winding device while maintaining durability since the protrusion 7 protrudes toward the fiber assembly 5 at the screen-drawing-out side SD1, thus the rigidity of the fiber assembly 5 is increased at the portion of the screen-drawing-out side SD1.

Note that the winding device without the protrusion is also included in the present technology.

Embodiment 8

Figure 14:
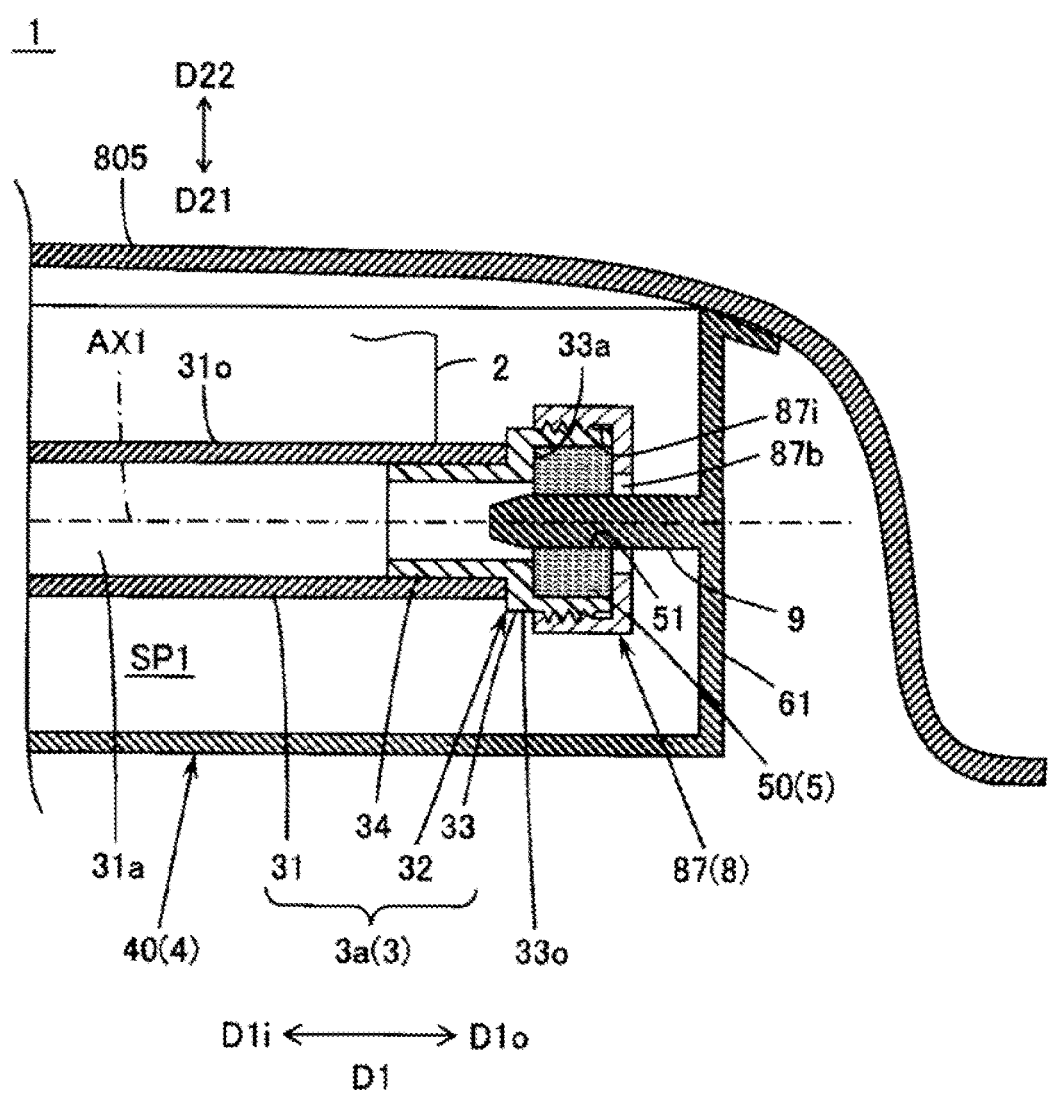
FIG. 14 is a vertical cross-sectional view schematically showing an example of the winding device having a fiber assembly inserted into an opening of the winding shaft.
Figure 15:
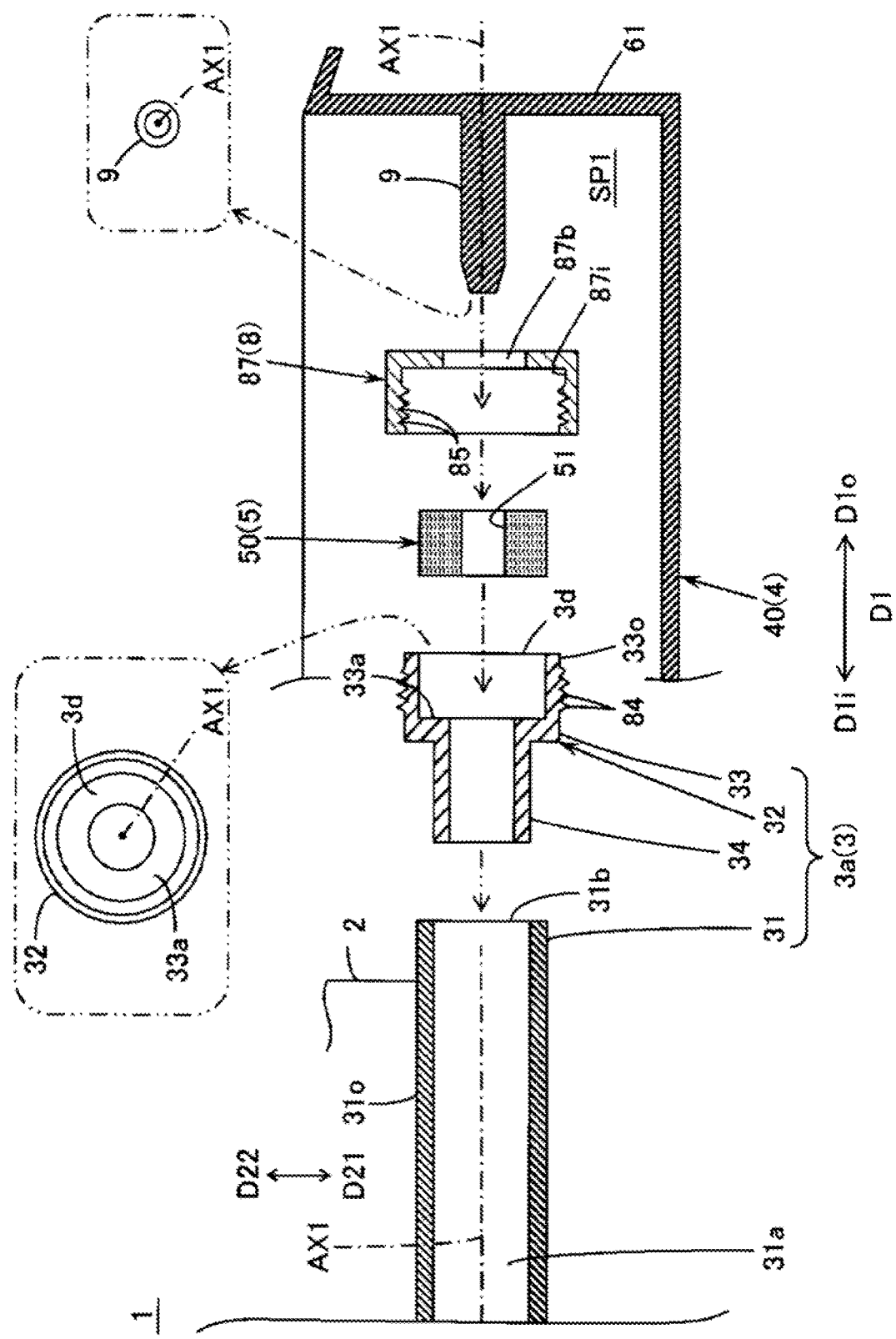
FIG. 15 is an exploded view schematically showing an example of the winding device having the fiber assembly inserted into the opening of the winding shaft.

As exemplified in FIGS. 14 and 15, a winding device 1 concerning another embodiment of the present technology includes a screen 2, a winding shaft 3 for winding the screen 2, the winding shaft 3 having an opening 3d at an end portion, a housing portion 4 for housing the winding shaft 3, a fiber assembly 5 that is in the opening 3d of the winding shaft 3, the fiber assembly 5 having a hole 51 along a center line direction D1 of the winding shaft 3, and a support shaft 9 that is in the hole 51 of the fiber assembly 5, the support shaft 9 supporting the fiber assembly 5 rotatably. Since the fiber assembly 5 in the opening 3d of the winding shaft 3 is supported rotatably by the support shaft 9, vibration applied to the winding device 1 is absorbed by the fiber assembly 5 even in consideration of a variation in the dimension of the housing portion 4 due to changes in temperature. Thus, abnormal noise is suppressed. Accordingly, also the present embodiment can suppress generation of abnormal noise when vibration is input or when the winding shaft is rotated.

(2) Concrete Example of Winding Device

FIG. 1 shows an example in which the winding device 1 is used as a sunshade device of a side door 802 of an automobile 800. In the figure, the winding device 1 is shown by breaking away an upper portion of a door trim 805. The automobile 800 shown in FIG. 1 is a road vehicle designed and equipped for being used on a road. In addition, the automobile 800 is a passenger car having a vehicle cabin C1 formed around front sheets and rear sheets. A door 802 and a pillar 803 are arranged at a side face portion of the vehicle cabin C1. The winding device 1 is assembled with the door 802 as a sunshade device. The winding device includes the devices called a shade device and a blind device. The winding device 1 shown in FIG. 1 is installed in an upper edge of the door trim 805 as an interior material of the side door. The screen 2 can be drawn out from the winding device 1.

The door 802 is equipped with a door panel 804, a door trim 805, a door window 806, a hook portion 810, and so on. The door panel 804 is a kind of a vehicle body panel made of metal such as a steel sheet. The trim 805 is an interior material attached to the vehicle cabin side of the panel 804. For the trim 805, a molded article formed by molding a resin material such as a thermoplastic resin by using injection molding or the like, and a resin material in which a skin material, such as a non-woven fabric, a woven fabric and a knitted fabric, is laminated on an interior base material can be used, for example. The trim 805 shown in FIG. 1 is equipped with an armrest 807 having a shape enabling a passenger to rest his/her arms for maintaining a comfortable posture. The winding device 1 is arranged on a back side of the trim 805 at a position upper than the armrest 807. The hook portion 810 is fixed to the panel 804 at a position upper than the window 806.

Figure 2:
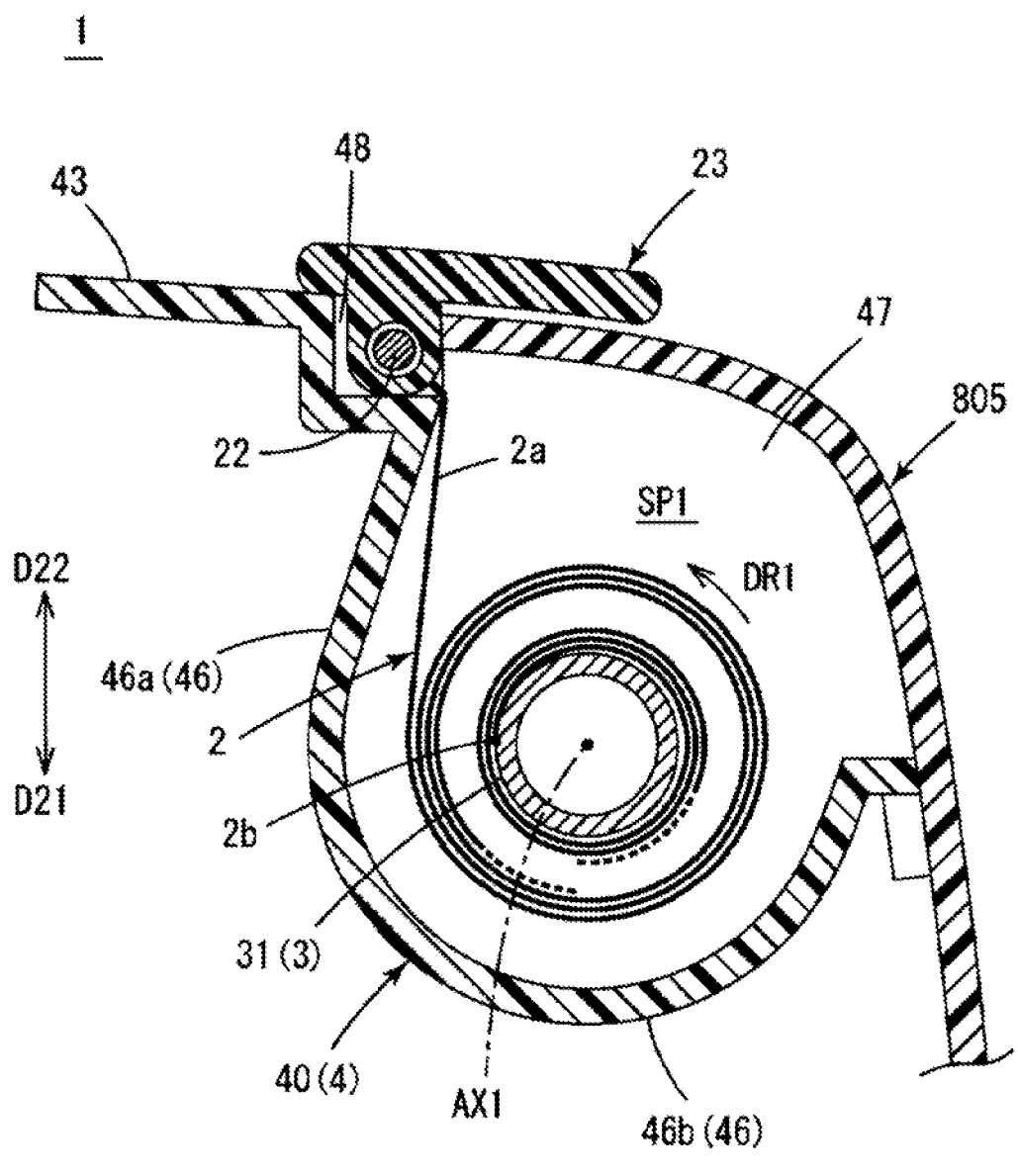
FIG. 2 is a transverse cross-sectional view schematically showing an example of the winding device.
Figure 3A:
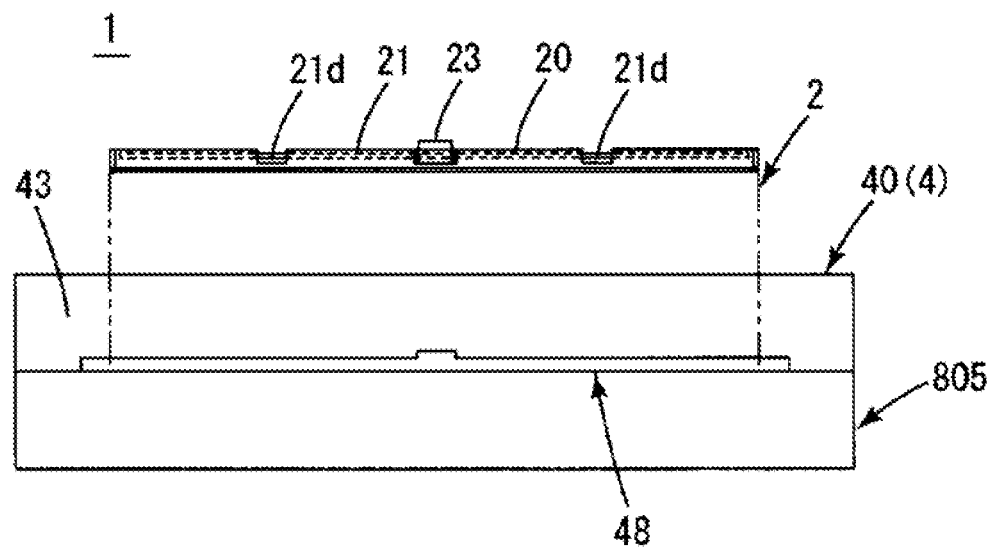
FIG. 3A is a plan view schematically showing an example of the winding device.
Figure 3B:
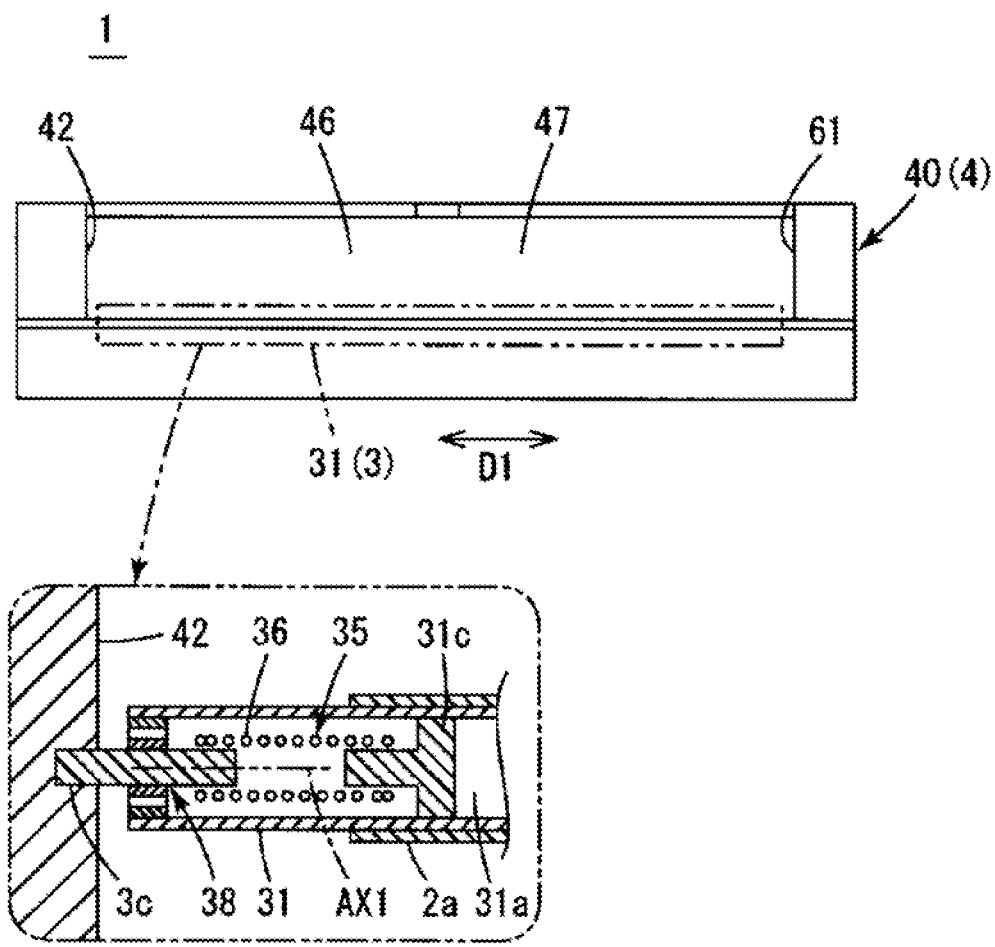
FIG. 3B is a side view schematically showing an example of a housing portion in which the winding shaft is housed.
Figure 4:
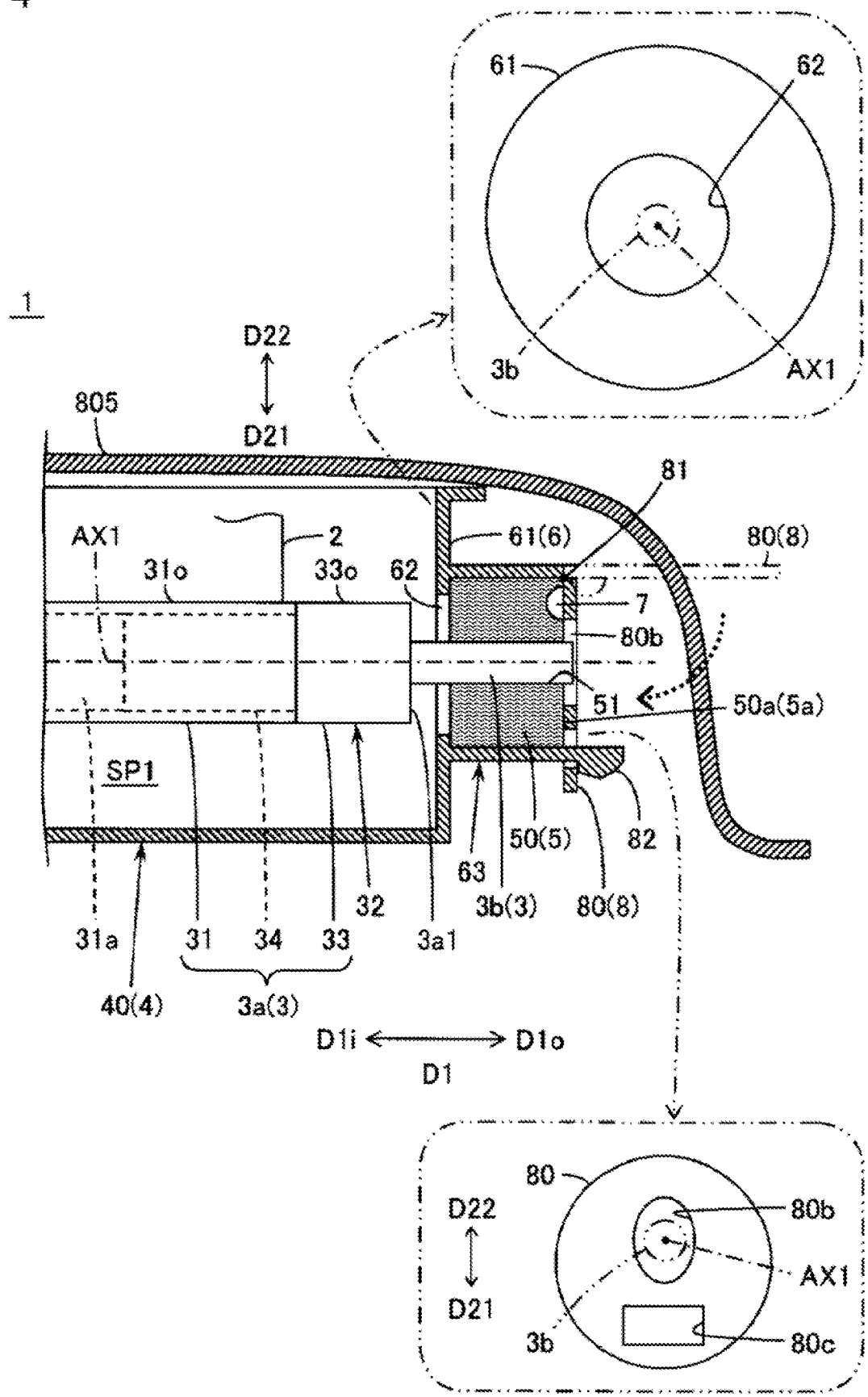
FIG. 4 is a vertical cross-sectional view schematically showing an example of the winding device.
Figure 5:
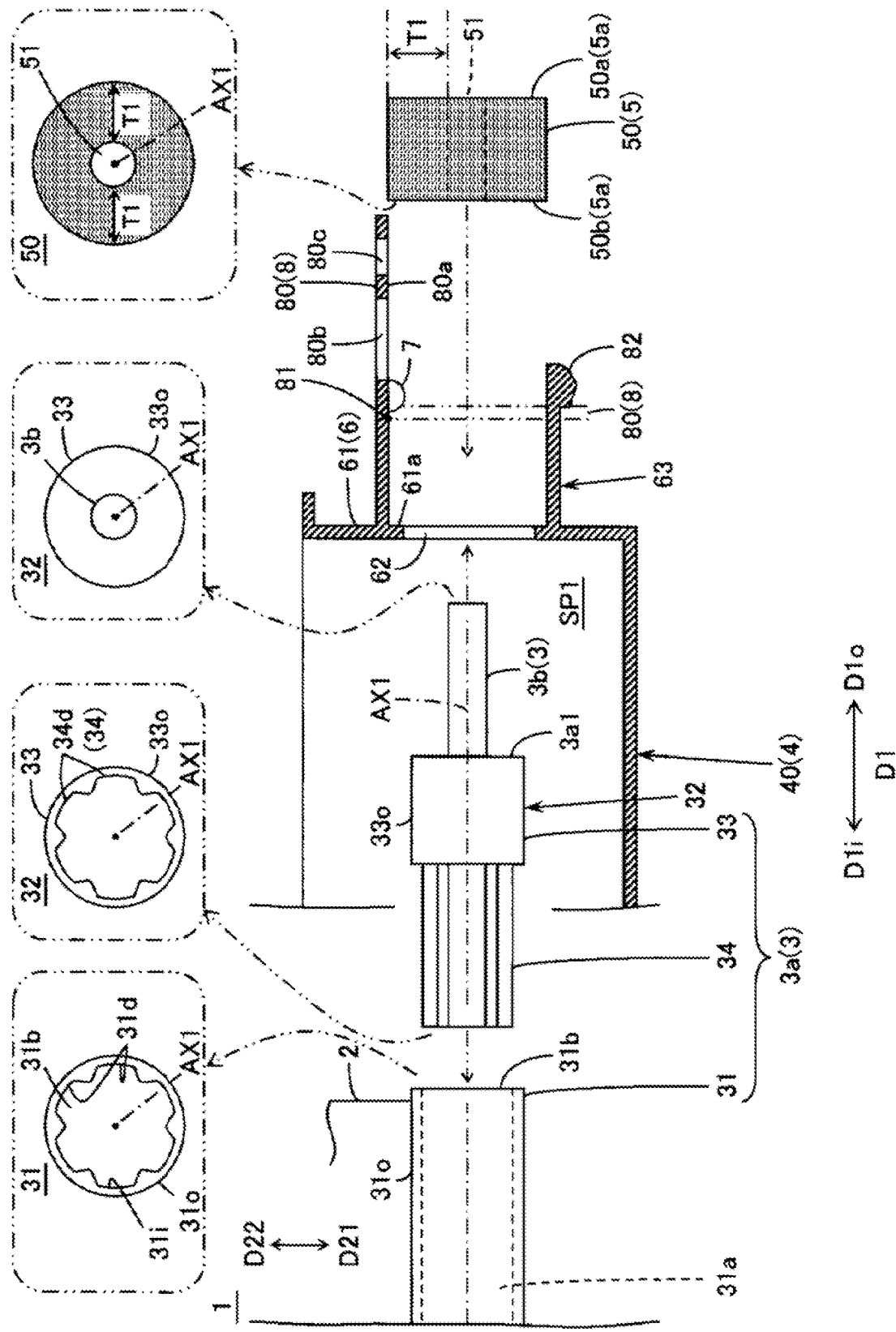
FIG. 5 is an exploded view schematically showing an example of the winding device.

In FIG. 1, the winding device 1 in which the screen 2 is wound around (housed in) the winding shaft 3 is schematically exemplified. FIG. 1 also exemplifies a state that the screen 2 is drawn out upward by a two-dot chain line. FIG. 2 is a vertical cross-sectional view schematically exemplifying the winding device 1. FIG. 2 shows the vertical cross section passing through the operation portion 23. FIG. 3A is a plan view schematically exemplifying the winding device 1. FIG. 3B is a side view schematically exemplifying a case 40 (example of the housing portion 4) in which the winding shaft 3 is installed. FIG. 3B also shows a cross-sectional view showing a main part of the winding shaft 3 in an enlarged state. FIG. 4 is a vertical cross-sectional view schematically exemplifying a main part of the winding device 1. FIG. 4 also shows a drawing of a wall portion 61 (example of the retention structure 6) of the case 40 viewed from the inside D1i in the center line direction D1 of the winding shaft 3 and a drawing of a lid portion 80 (example of the prevention structure 8) viewed from the outside D1o in the center line direction D1 of the winding shaft 3. In FIG. 4, the case 40, the trim 805 and a felt 50 (example of the fiber assembly 5) are shown by cross section. Note that "inside in the center line direction" and "outside in the center line direction" are not the terms for indicating the direction but the terms for indicating the location. Accordingly, for example, "toward the outside in the center line direction" means to be directed to a predetermined location located at the outside of a predetermined reference point. Thus, the direction displaced from the center line direction D1 is also included. FIG. 5 is an exploded view schematically exemplifying a main part of the winding device 1. FIG. 5 also shows a drawing of a cylindrical body 31 viewed from the outside D1o in the center line direction, a drawing of an end member 32 viewed from the inside D1i in the center line direction, a drawing of the end member 32 viewed from the outside D1o in the center line direction, and a drawing of the felt 50 viewed from the inside D1i in the center line direction.

Note that a reference sign D21 indicates a housing direction of the screen 2, a reference sign D22 indicates a drawing direction of the screen 2, a reference sign AX1 indicates a center line of the winding shaft 3, a reference sign D11 indicates a case direction directed from the trim 805 to the case 40, a reference sign D12 indicates a trim direction directed from the case 40 to the trim 805, and a reference sign DR1 indicates a winding direction of the screen 2. The housing direction D21 and the drawing direction D22 are opposite to each other. For example, the housing direction D21 is approximately downward and the drawing direction D22 is approximately upward. The case direction D11 and the trim direction D12 are opposite to each other. For example, the case direction D11 is an approximately outward direction of the width direction of the automobile 800 and the trim direction D12 is an approximately inward direction of the width direction of the automobile 800.

The screen 2 is also called as a shielding sheet or a blind sheet. The screen 2 blocks at least a part of transmitted light. A screen body 2a of the screen 2 is made of a thin material having flexibility to be drawn out from a predetermined winding position P11 to a predetermined drawing position P12. The screen body 2a can be wound from the drawing position P12 to the winding position P11. The screen body can be a material having a mesh or a sheet-like material without having a mesh. The screen body can be a cloth such as polyester woven fabric, leather using resin material, a sheet formed by molding resin material and the like. The screen body can be a translucent sheet and a transparent sheet capable of blocking ultraviolet rays, for example. The transmitted light includes ultraviolet rays and the like. The screen body for the sunshade device is formed, for example, by cutting a soft material having a light-shielding property of approximately 50 to 90% and having flexibility into a predetermined shape. The screen body is drawn out upward from the half case 40 and covers a vehicle door window from inside the vehicle cabin. The winding device 1 blocks sunlight to protect occupants from dazzling, and reduces visibility from outside of the vehicle for protecting privacy and protecting against crime during parking.

The base edge 2b of the screen body 2a shown in FIG. 2 is adhered to an external surface of the cylindrical body 31 (main part of the body portion 3a) of the winding shaft 3 by a double-sided tape, for example. Thus, the cylindrical body 31 fastens a base edge (one end) 2b of the screen 2.

A drawing end 20 of the screen 2 shown in FIG. 3 has a bag-like portion and a core material 22. The core material 22, which passes through a resin-made operation portion 23, is inserted into the bag-like portion 21. The operation portion 23 is lever-like, and the screen body 2a can be easily drawn out from the housing portion 4 by pinching the operation portion 23. When the screen body 2a is drawn out, the drawn-out state of the screen body 2a can be maintained by inserting the hook portion 810 of the door side into an engagement hole 21d and hooking the drawing end 20 on the hook portion 810.

The winding shaft 3 shown in FIG. 3B, FIG. 5 and other figures has a cylindrical body 31, an end member 32 and a bearing portion 38 of a wall portion 42 side. The winding shaft 3 is equipped with a spring 36 (biasing mechanism 35) and can wind the screen body 2a by a force applied by the spring 36.

The cylindrical body 31 is arranged in the case 40 so that the cylindrical body 31 is rotatable around the center line AX1. The base edge 2b of the screen body 2a is fastened to the cylindrical body 31 at an outer peripheral surface 31o. The cylindrical body 31 may have a tubular shape such as a cylindrical shape or a bar shape such as a columnar shape. The cylindrical body 31 shown in FIG. 3B and other figures is a long tubular member having openings at both ends. A hooking portion 31c of the spring 36 is inserted in a hollow portion 31a formed along the center line AX1. The above described cylindrical body 31 is also called as a barrel or the like. The end member 32 shown in FIG. 4 is attached to one end of the cylindrical body 31, and the bearing portion 38 is attached to the other end of the cylindrical body 31. As shown in FIG. 5, an inner peripheral portion 31i of the cylindrical body 31 has a noncircular cross section in the center line direction D1, and a plurality of grooves 31d is formed on the inner peripheral portion 31i along the center line direction D1. Although a metal worked article such as an extrusion molded article of aluminum is suitable for the cylindrical body 31, a molded article of synthetic resin such as an extrusion molded article of thermoplastic resin can be also used, for example. The size of the cylindrical body formed in a cylindrical shape is not particularly limited. For example, an inner diameter can be approximately 4 to 20 mm, and an outer diameter can be approximately 6 to 30 mm.

The end member 32 shown in FIG. 5 and other figures has a base portion 33 (a part of the body portion 3a), an inner engagement portion 34 (a part of the body portion 3a) and a projecting portion 3b that protrudes toward the outside D1o in the center line direction from the end face 3a1 of the outside D1o in the center line direction of the base portion 33. An outer peripheral surface 33o of the base portion 33 is fitted to the outer peripheral surface 31o of the cylindrical body 31. The inner engagement portion 34 is fitted in an opening 31b formed on the end portion of the cylindrical body 31. Accordingly, the cylindrical body 31, the inner engagement portion 34 and the base portion 33 are concrete examples of the body portion of the winding shaft. In addition, the projecting portion 3b is a concrete example of the end portion of the winding shaft.

The inner engagement portion 34 shown in FIG. 5 is projected toward the inside D1i in the center line direction from the end face of the base portion 33 in the inside D1i in the center line direction. The outer peripheral portion of the inner engagement portion 34 has a noncircular cross section in the center line direction D1, and a plurality of projected ridges 34d is formed on the outer peripheral portion along the center line direction D1. The cross-sectional shape of the outer peripheral portion of the inner engagement portion 34 in the center line direction D1 is fitted to the cross-sectional shape of the inner peripheral portion 31i of the cylindrical body 31. Since each of the projected ridges 34d of the inner engagement portion 34 projected toward the inside D1i in the center line direction from the base portion 33 enters in the grooves 31d of the cylindrical body 31, the end member 32 is attached to the cylindrical body 31 so as not to rotate relative to the cylindrical body 31. Thus, the end member 32 can be rotated around the center line AX1 together with the cylindrical body 31.

The projecting portion 3b shown in FIG. 5 and other figures has a smaller outer diameter than an outer diameter of the base portion 33. The projecting portion 3b is inserted into the through hole 51 of the felt 50 which is the bearing portion of the wall portion 61 side. Thus, the projecting portion 3b is rotatably supported by the felt 50. The projecting portion 3b may have a bar shape such as a columnar shape or a tubular shape such as a cylindrical shape.

For the end member 32, a molded article such as an injection molded article of synthetic resin can be used, for example. For the synthetic resin, thermoplastics resins such as polyamide, polypropylene (PP), polyacetal (POM) and polybutylene terephthalate (PBT) can be used, for example. Additives such as a reinforcing fiber and the like can be added to the above described resins.

The bearing portion 38 shown in FIG. 3B is arranged on the end portion opposite to the end member 32 in the long winding shaft 3. The bearing portion 38 has a projecting portion 3c fixed to the wall portion 42 which is opposite to the wall portion 61 in the long case 40. The cylindrical body 31 is fitted on the outside of the bearing portion 38. One end of the spring 36, which is a coil spring, is fixed to a fixing portion of the bearing portion 38. The other end of the spring 36 is fixed to a hooking portion 31c. The hooking portion 31c is inserted into the cylindrical body 31 so as not to rotate relative to the cylindrical body 31. Thus, the hooking portion 31c can be rotated around the center line AX1 together with the cylindrical body 31. The spring 36 applies a force toward the housing direction D21 to the screen 2. In general, the winding shaft 3 having the biasing mechanism 35 is attached to the case 40 so as to apply a force to the screen 2 in the winding direction DR1 even when the screen 2 is housed in the case 40.

Note that the biasing mechanism can be attached to a portion other than an inner peripheral side of the cylindrical body 31. For example, the biasing mechanism can be attached to an outer peripheral side of the cylindrical body or an outer side of the end portion in the longitudinal direction of the cylindrical body. The biasing mechanism can be unitized. The biasing mechanism can be an inner spring unit inserted into the cylindrical body or an outer spring unit provided outside the cylindrical body as exemplified in Japanese Unexamined Patent Application Publication No. 2015-42505. The biasing mechanism can be a spiral spring or an elastic member formed of elastomer or a rubber, for example.

Furthermore, the present technology also includes an electric type in which the screen is drawn out and wound by driving a motor or a case of manually winding the screen without having the biasing mechanism on the winding shaft, for example.

The half case 40 shown in FIGS. 2, 3A, 3B and other figures has a pair of wall portions 61, 42 formed on both end portions in the center line direction D1 of the winding shaft 3, and a side face portion 46 on which an opening portion 47 is formed. The half case 40 houses the winding shaft 3. As "side face" can mean faces other than the bottom face of a rectangular column, a cylindrical column and the like, the side face portion 46 means a portion of surrounding the winding shaft 3 housed in the case 40. Consequently, the side face portion 46 includes a back portion 46a, which is a portion arranged in a longitudinal direction viewed from a user, and a bottom portion 46b, which is arranged in a vertical direction viewed from a user. The half case 40 is a half-split body forming a part of the housing of the winding device 1. When the half case 40 is aligned with the trim 805, a housing space SP1 of the winding shaft 3 and the like is formed. The case 40 shown in FIG. 2 has an outwardly extending portion 43 extended from the back portion 46a to the case direction D11. The winding device 1 has a slit 48 formed between the outwardly extending portion 43 and the trim 805 for drawing out the screen body 2a from the housing space SP1. Note that the case 40 can be unitized by being preliminarily assembled with the components such as the screen 2. The case 40 is fastened to the vehicle body by inserting a conventionally known fastening means such as a screw into a plurality of through holes 40a (shown in FIG. 1) formed on the unitized case 40. Thus, the winding device 1 is integrated with the vehicle body.

The through hole 62 for inserting the projecting portion 3b of the winding shaft 3 is formed on the wall portion 61 shown in FIGS. 4, 5 and other figures. The wall portion 61 is arranged between the end face 3a1 of the end member 32 and the felt 50 in the center line direction D1. The through hole 62 has a size not allowing the felt 50 to pass through. Consequently, the wall portion 61 prevents the felt 50 from being shifted toward the inside D1i in the center line direction and keeps the felt 50 apart from the end face 3a1 of the end member. The through hole 62 shown in FIG. 4 and other figures is circular having an inner diameter larger than an inner diameter of the through hole 51 of the felt 50 so that the body portion 3a of the winding shaft 3 can be inserted into the through hole 62. Consequently, the winding shaft 3 can be installed on the case 40 after the body portion 3a is inserted into the through hole 62. Note that the winding shaft 3 is prevented from being shifted in the center line direction D1 by the bearing portion 38 of the wall portion 42 side so that the end face 3a1 of the end member 32 is not in contact with the felt 50.

Of course, if the winding shaft 3 can be installed on the case 40 without inserting the body portion 3a into the through hole 62, the through hole 62 can have a size not allowing the body portion 3a to pass through as long as the projecting portion 3b can pass through the through hole 62. Also in this case, the wall portion 61 is not in contact with the projecting portion 3b. Both the case when the through hole 62 has a size not allowing the body portion 3a to pass through and the case when the through hole 62 has a size allowing the body portion 3a to pass through are included in the configuration where the wall portion 61 is arranged between the end face 3a1 of the body portion and the felt 50 in the center line direction D1.

In addition, the shape of the through hole 62 is not limited to the circular shape. The through hole 62 can have an elliptical shape or a polygonal shape, for example.

On the outside D1o in the center line direction of the wall portion 61, a felt supporting portion (fiber assembly supporting portion) 63 for supporting the felt 50 is formed. A lid portion 80 is connected to the felt supporting portion 63 via an integral hinge 81. A hook portion 82 is formed on the felt supporting portion 63 so that the hook portion 82 is inserted into a through hole 80c of the lid portion 80 to lock the lid portion 80 after the bending operation. FIGS. 3A, 3B, 4 and 5 exemplify a resin-made case 40 in which the felt supporting portion 63, the lid portion 80, the hinge 81 and the hook portion 82 are integrally formed together with the wall portions 61, 42, the outwardly extending portion 43 and the side face portion 46. Note that the present technology includes the configuration where the case 40 is formed by combining a plurality of components. For example, a part of the above described components can be formed separately from the remaining part and then assembled with the remaining part to form the case 40.

The opening portion 47 shown in FIG. 2 and other figures is a part which is substantially covered with the trim 805 and from which the screen body 2a is drawn out.

For the case 40, a molded article such as an injection molded article of synthetic resin can be used, for example. As the synthetic resin, general-purpose resins, which are lightweight and low-priced, can be used for the case, for example. As the general-purpose resins, PP, polyethylene (PE), and a material formed by adding additives to the above materials can be used, for example.

The felt 50 shown in FIG. 5 and other figures has the through hole 51 for inserting the projecting portion 3b of the end member 32 of the winding shaft into the through hole 51. The felt 50 is formed in a cylindrical shape by assembling fibers. The felt 50 rotatably supports the projecting portion 3b of the end member 32 in a state of being inserted into the felt supporting portion 63 of the case 40. The protrusions 7 formed on the lid portion 80 are inserted into an end face 50a (end face 5a of the fiber assembly) of the felt 50 on the outside D1o in the center line direction. Thus, the felt 50 is compressed. Note that the hole of the felt 50 is not limited to the through hole. The hole can be closed at the end face 50a on the outside D1o in the center line direction.

For the fibers forming the felt 50, wool, fibers of the synthetic resin (inclusive of elastomers) such as polyester (e.g., polyethylene terephthalate (PET)), polyolefin and a polyamide, fibers obtained by adding an additive to the synthetic resin, rayon and combinations of the above described fibers can be used, for example. The felt 50 can include a material (e.g., binder) other than the fiber.

A density of the felt 50 can be approximately 0.02 to 0.4 g/cm$^3$ (preferably approximately 0.1 to 0.3 g/m$^3$), for example. In order to reduce the deformation of the felt after the screen is repeatedly drawn out and wound, it is required to increase the density of the felt. In order to reduce the noise caused by friction between the projecting portion of the rotating winding shaft and the felt, it is required to reduce the density of the felt.

A thickness T1 of the felt 50 can be 2 to 20 mm, for example.

The protrusions 7 shown in FIG. 4 and other figures protrude toward the felt 50 side from the end face 50a of the felt 50 in the center line direction D1. FIG. 6A is a schematic diagram of the lid portion 80 (prevention structure 8) having a plurality of protrusions 7 viewed from the inside D1i in the center line direction. The protrusions 7 are expanded in an approximately hemispherical shape toward the inside D1i in the center line direction from the inner surface (protrusion forming surface 80a) of the lid portion 80 in a state of being installed on the felt supporting portion 63. Of course, the shape of the protrusions 7 is not limited to the hemispherical shape. The protrusions 7 can have a tubular shape such as a cylindrical shape and a prismatic shape, a conical shape such as a circular conical shape and a pyramidal shape or the like. Since the protrusions 7 are formed on the protrusion forming surface 80a of the lid portion 80, when the lid portion 80 is installed on the felt supporting portion 63, the protrusions 7 are pushed from the end face 50a of the felt 50 into the felt 50. Thus, the felt 50 is compressed.

The position of the protrusions 7 is not particularly limited. The protrusions 7 can be located at the position in contact with the felt supporting portion 63. From the viewpoint of suppressing rotational resistance to the projecting portion 3b, it is suitable that the protrusions 7 are located at a position where the protrusions 7 are not touch the projecting portion 3b.

The protrusions 7 shown in FIG. 6A exist from the center line AX1 to the screen-drawing-out side SD1 of the winding shaft 3 and does not exist from the center line AX1 to the screen-drawing-in side SD2. FIG. 6B schematically shows the arrangement of the protrusions 7 with respect to the end face 50a of the felt 50 in the center line direction D1 when the lid portion 80 shown in FIG. 6A is installed on the felt supporting portion 63. As shown in FIG. 6B, in the end face 50a of the felt, S1 indicates the area where the protrusions 7 protrude toward the felt 50 side on the screen-drawing-out side SD1 from the center line AX1 of the winding shaft 3, and S2 indicates the area where the protrusions 7 protrude toward the felt 50 side on the screen-drawing-in side SD2 from the center line AX1 of the winding shaft 3. As shown in FIG. 6B, S1>S2.

Figure 7A:
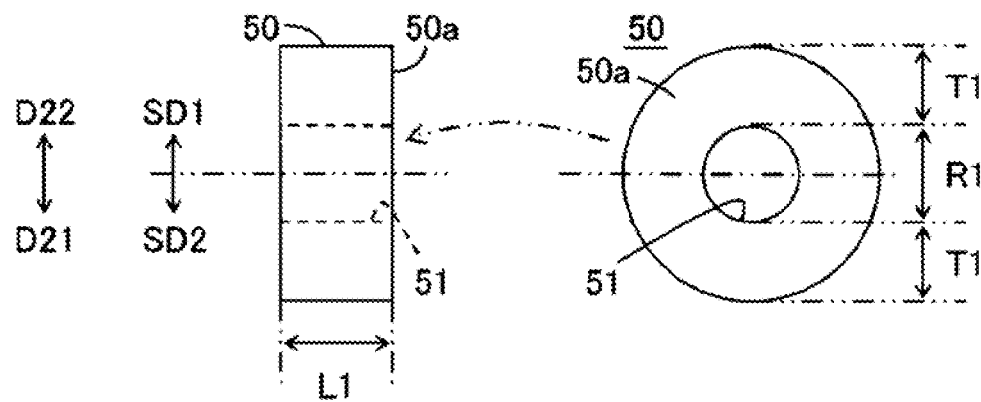
FIG. 7A is a drawing schematically showing an example of the fiber assembly before a durability test.
Figure 7B:
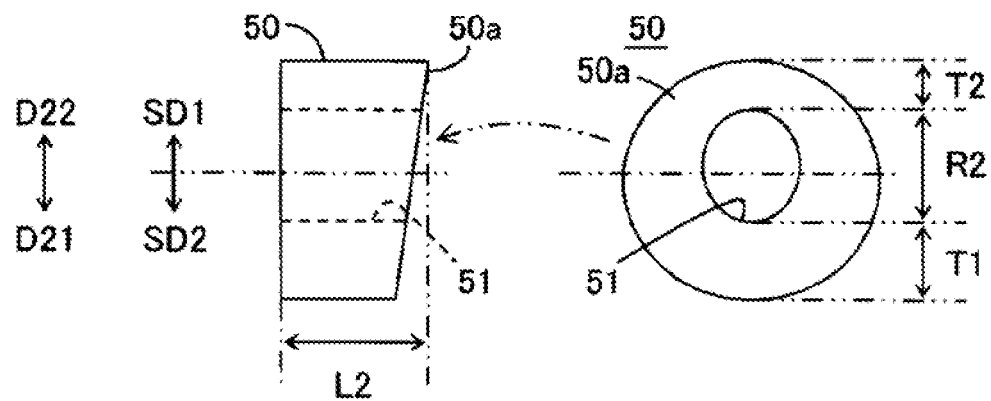
FIGS. 7B and 7C are drawings schematically showing examples of the fiber assembly after the durability test.
Figure 7C:
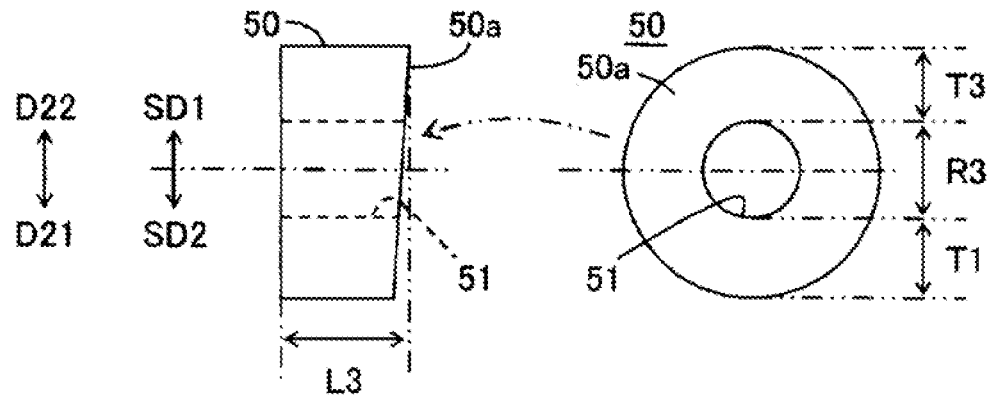

FIG. 7A schematically shows an example of the felt before durability test in which the screen 2 is repeatedly drawn out and wound. FIG. 7B schematically shows an example of the fiber assembly after the durability test in the winding device without having the protrusions 7 formed on the lid portion 80. FIG. 7C schematically shows an example of the fiber assembly after the durability test in the winding device having the protrusions 7 formed on the lid portion 80 as shown in FIG. 6A. In FIGS. 7A to 7C, patterns formed on the fibers of the felt are omitted. On the left side of FIGS. 7A to 7C, the felt view from the outside D1o in the center line direction is shown. On the right side of FIGS. 7A to 7C, the left side face of the felt is shown. Note that the felt 50 before the durability test had a diameter R1 of the through hole 51 of 6 mm, a thickness T1 of 5 mm, and a length L1 of 7 mm in the center line direction D1. In the durability test, the screen 2 was drawn out and wound for 20000 times.

As shown in FIG. 7B, when the protrusions 7 were not formed on the lid portion 80, the felt 50 was slightly deformed in the drawing direction D22 at the screen-drawing-out side SD1. Consequently, a diameter R2 of the through hole 51 was 7 mm, a thickness T2 was 3 mm, and a length L2 in the center line direction D1 was 10 mm. Although wrinkles due to inclination of the winding shaft 3 were slightly found on the draw out screen body 2a, generation of noise was suppressed.

As shown in FIG. 7C, when the protrusions 7 were formed on the lid portion 80 at the screen-drawing-out side SD1, the deformation of the felt 50 was reduced at the screen-drawing-out side SD1. Consequently, a diameter R3 of the through hole 51 was maintained to be 7 mm, a thickness T3 was 4.8 mm (reduction was suppressed), and a length L3 in the center line direction D1 was 8 mm (increase was suppressed). It is assumed that rigidity was increased because the protrusions 7 were pushed into the felt 50 and the felt 50 was compressed at the screen-drawing-out side SD1. On the other hand, since the protrusions 7 are not formed at the screen-drawing-in side SD2, the force required for pushing the protrusions 7 into the felt 50 can be reduced when installing the lid portion 80 on the felt supporting portion 63 into which the felt 50 is inserted. Accordingly, the concrete example having the protrusions 7 arranged as shown in FIGS. 6A and 6B can provide an easily assembled winding device while further improving durability.

Figure 6D:
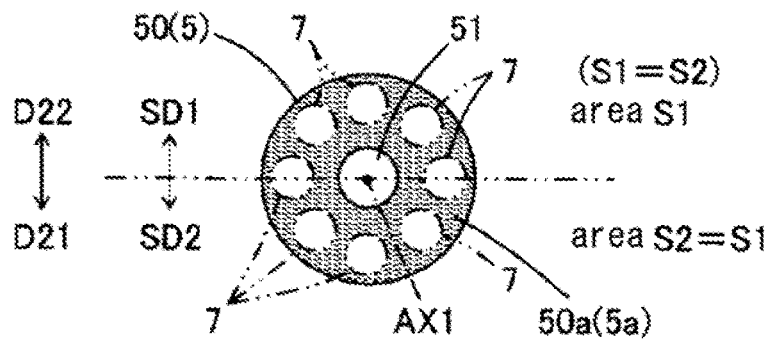

As exemplified in FIGS. 6C and 6D, the protrusions 7 can be arranged also at the screen-drawing-in side SD2. A plurality of protrusions 7 shown in FIG. 6C includes the protrusions 7a interposed between both sides SD1 and SD2. In this case, the area S2 of the protrusions 7 of the screen-drawing-in side SD2 is not 0 but is smaller than the area S1 of the screen-drawing-out side SD1. Accordingly, the concrete example having the protrusions 7 arranged as shown in FIG. 6C can provide an easily assembled winding device while further improving durability. On the other hand, a plurality of protrusions 7 shown in FIG. 6D are approximately uniformly arranged on both sides SD1 and SD2, thus S1=S2. Accordingly, although the protrusions 7 should be strongly pushed into the felt 50 when installing the lid portion 80 on the felt supporting portion 63 into which the felt 50 is inserted, durability can be further improved.

The lid portion 80 shown in FIGS. 4, 5 and other figures is openable and closable around the hinge 81 with respect to the felt supporting portion 63. The lid portion 80 has a through hole 80*b* into which the projecting portion 3*b* of the winding shaft 3 is inserted and a through hole 80*c* into which the hook portion 82 is inserted. The through hole 80*b* shown in FIG. 4 has an elliptical shape in which the long diameter is oriented in the drawing direction D22 and the housing direction D21 considering that the position of the projecting portion 3*b* is slightly changed in the drawing direction D22 and the housing direction D21 of the screen 2. Of course, the shape of the through hole 80*b* is not limited to an elliptical shape. The through hole 80*b* can have a perfect circular shape or a polygonal shape, for example. When the hook portion 82 is inserted into the through hole 80*c* for inserting the hook portion and the lid portion 80 is locked to the hook portion 82, the protrusion forming surface 80*a* prevents the felt 50 from shifting toward the outside D1*o* in the center line direction. Since the lid portion 80 is connected to the felt supporting portion 63 via the hinge 81, a separate component for preventing the felt 50 from shifting toward the outside D1*o* in the center line direction is not required.

(3) Operations and Effects of Winding Device Concerning Concrete Example

When the cylindrical body 31 is formed of aluminum and the case 40 is formed of a low-priced PP, a linear expansion coefficient of the case 40 is considerably larger than a linear expansion coefficient of the cylindrical body 31. Hence, it is necessary to design the components considering variation in the size of the components, especially the case 40, due to temperature change. Further, vibration is applied from the automobile to the winding device 1 mounted on the automobile when the automobile is driven. In addition, operations of drawing out the screen 2 and housing the screen 2 are repeatedly performed on the winding device 1 and the winding shaft 3 is rotated during the operations. If the bearing portion of the projecting portion of the winding shaft is not the fiber assembly but made of resin or made of metal, a clearance may be generated between the projecting portion of the winding shaft and the bearing portion due to the design considering variation in the size of the components. In such a case, abnormal noise may be generated when vibration is applied to the winding device or when the winding shaft is rotated. If a special resin material for reducing the linear expansion coefficient is used for the case, the resin material forming the case becomes expensive.

Since the above described projecting portion 3*b* of the winding shaft 3 of the winding device 1 is rotatably supported by the felt 50, even if the design considering variation in the size of the components is adopted, vibration applied to the winding device 1 is absorbed by the felt 50. Thus, abnormal noise is suppressed. Accordingly, the present concrete example can suppress the abnormal noise when vibration is input or when the winding shaft is rotated.

Figure 8:
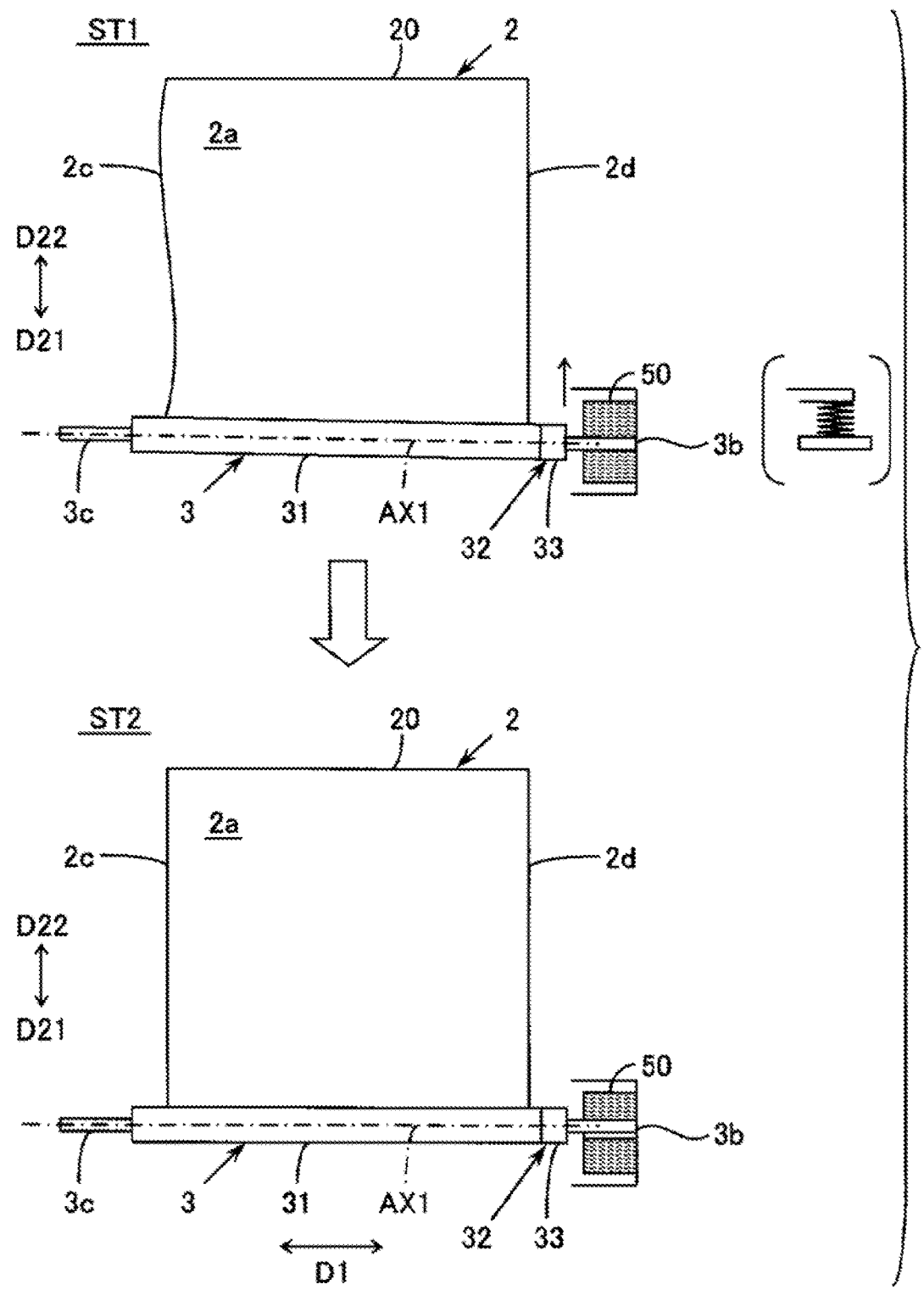
FIG. 8 is a drawing schematically exemplifying an action of preventing slack of the screen.

In addition, as exemplified in FIG. 8, the present concrete example also has an effect of preventing an edge portion 2*c* of the drawn out screen 2 from slacking. The state ST1 of FIG. 8 shows that slack is formed on one of both edge portions 2*c*, 2*d* of the screen body 2*a* (on the edge portion 2*c* located on the far side from the felt 50) when assuming that the felt 50 is not elastically deformed. Actually, as exemplified in the brackets of FIG. 8, the felt 50 has a property of elastically deforming like a spring. Hence, as shown in the state ST2, the projecting portion 3*b* slightly shifts in the drawing direction D22, the screen body 2*a* is slightly wound by the winding shaft 3, and the slack of the edge portion 2*c* disappears (decreases). As explained above, the elastically deformable felt 50 has an aligning function for adjusting the center line AX1 of the winding shaft 3. Consequently, the slack of the edge portion 2*c* is suppressed and appearance of the screen 2 is improved.

Figure 18:
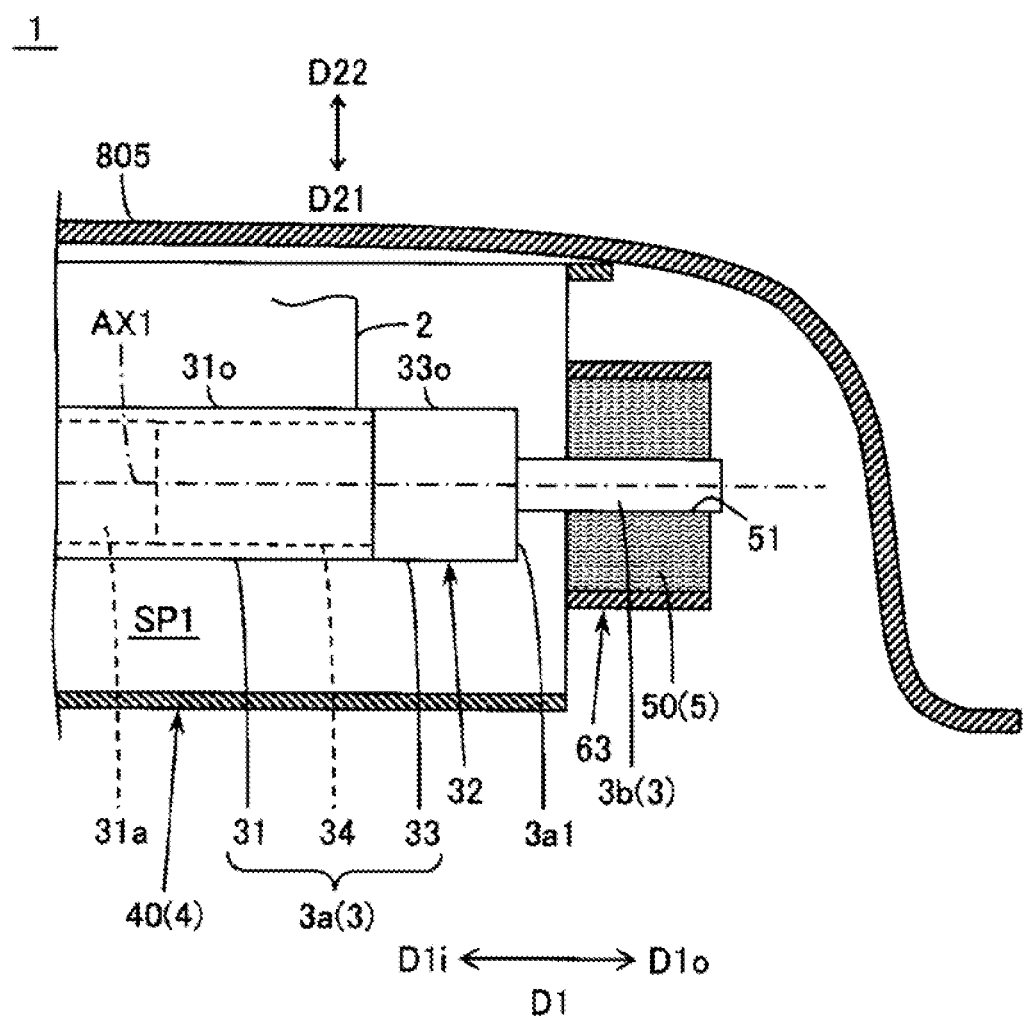
FIG. 18 is a vertical cross-sectional view schematically showing an example of the winding device.
Figure 19:
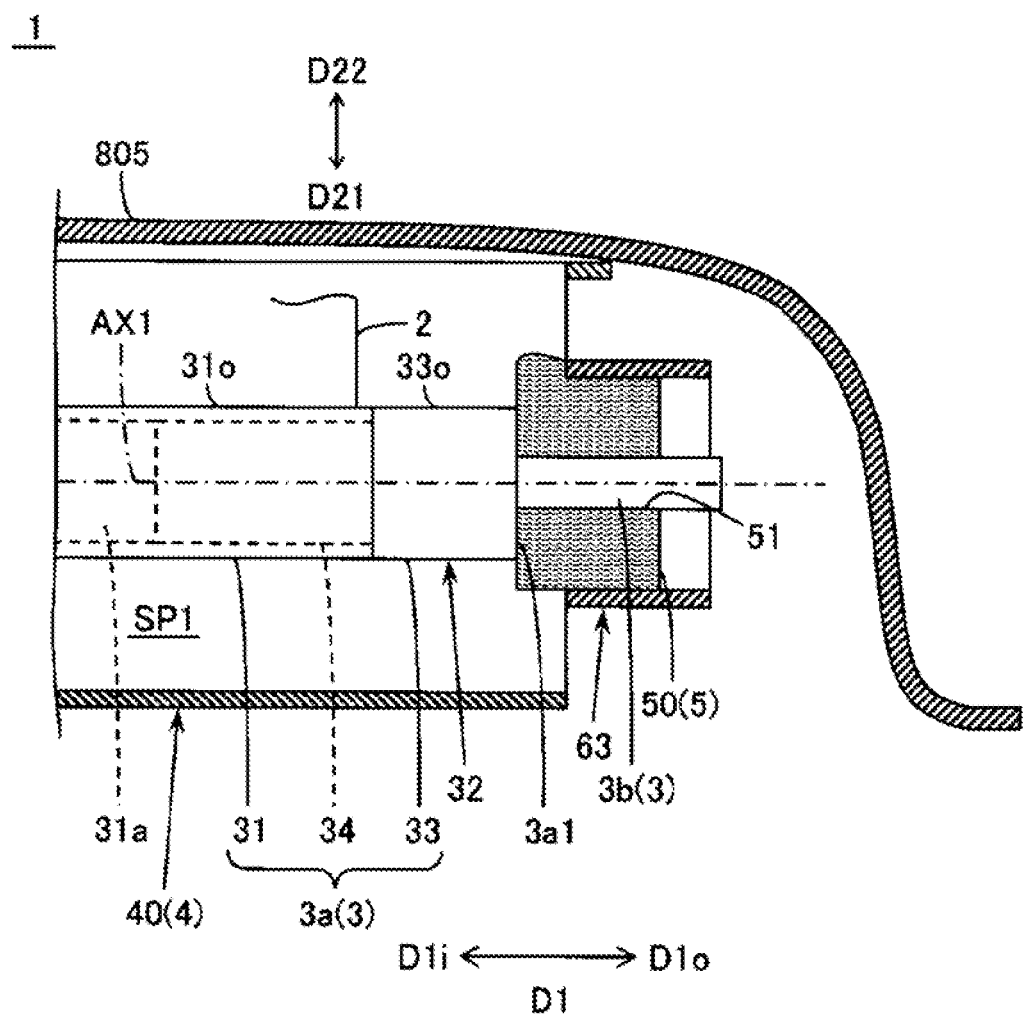
FIG. 19 is a vertical cross-sectional view schematically showing an example where the fiber assembly is in contact with the end face of a body portion of the winding shaft.

Furthermore, as exemplified in FIG. 18, even when the retention structure 6 for keeping the felt 50 apart from the end face 3*a*1 of the body portion 3*a* of the winding shaft is not provided, the effect of suppressing the abnormal noise can be obtained when vibration is input or when the winding shaft is rotated. Further, as exemplified in FIG. 9, when the felt 50 shifts toward the inside D1*i* in the center line direction and abuts on the end face 3*a*1 of the body portion 3*a* of the winding shaft due to a repeated rotating operation of the winding shaft 3 or a thermal expansion of the components, rotational resistance is generated at the winding shaft 3. In addition, the felt 50 may enter into a clearance around the end face 3*a*1 and may be deformed. Since the retention structure 6 shown in FIG. 4 and other figures is formed on the winding device 1, the rotational resistance caused when the felt 50 abuts on the end face 3*a*1 of the body portion 3*a* of the winding shaft is suppressed. As a result, the deformation of the felt 50 is suppressed and the durability of the winding device is improved.

Furthermore, as shown in FIG. 4 and other figures, when the protrusions 7 are pushed into the felt 50, the felt 50 is compressed. Thus, the rigidity of the felt 50 is increased. Since the protrusions 7 protrude toward the felt 50 side from the end face 50*a* of the felt in the center line direction D1, the durability of the winding device is improved. In particular, as shown in FIGS. 6A to 6C, in the end face 50*a* of the felt in the center line direction D1, when the area S1 of the protrusions 7 on the screen-drawing-out side SD1 from the center line AX1 is larger than the area S2 of the protrusions 7 on the screen-drawing-in side SD2, the force required for pushing the protrusions 7 into the felt 50 can be reduced when installing the lid portion 80. Accordingly, the concrete example having the protrusions 7 arranged as shown in FIGS. 6A to 6C can provide an easily assembled winding device while further improving durability.

(4) Variation Examples

Various variation examples are conceivable for the present invention.

The winding device as the sunshade device can be installed on a rear window, a roof window or a front window, for example, without limited to a side window. The winding device can be a tonneau cover device, for example. The drawing direction of the screen can be downward and horizontally, for example, without limited to upward.

The position to install the winding shaft can be a case surrounding an approximately entire periphery of the winding shaft or a trim such as a door trim, without limited to the half case.

The positon of forming the protrusions 7 is not limited to the lid portion 80 (prevention structure 8). The protrusions 7 can be formed on the retention structure 6, for example.

Figure 9:
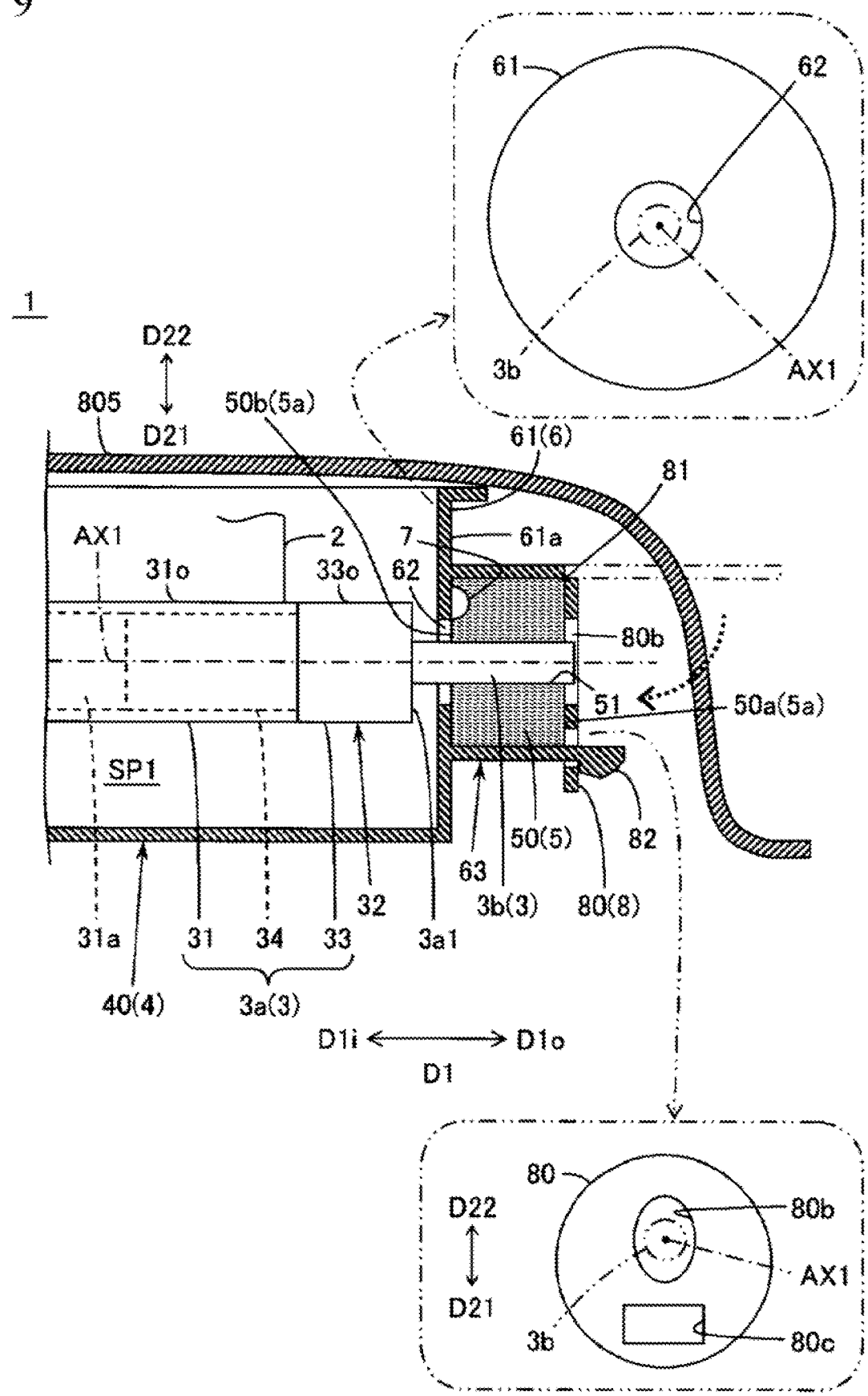
FIG. 9 is a vertical cross-sectional view schematically showing an example of the winding device having a wall portion on which a protrusion is formed.

FIG. 9 schematically shows an example of the winding device having the wall portion 61 (retention structure 6) on which the protrusions 7 are formed. In the variation examples explained below, the same reference signs are assigned to the similar components as the above described examples. The explanation of such components will be omitted.

The protrusions 7 shown in FIG. 9 protrude toward the felt 50 side from an end face 50*b* of the felt 50 (end face 5*a* of the fiber assembly) in the center line direction D1. Since the protrusions 7 are formed on a wall surface 61*a* of the wall portion 61, when the lid portion 80 is installed on the felt supporting portion 63, the protrusions 7 are pushed from the end face 50*b* of the felt 50 to the felt 50. Thus, the felt 50 is compressed and the rigidity is increased. Since the protrusions 7 have entered the felt 50 side from the end face 50*b* of the felt in the center line direction D1, the durability of the winding device is improved.

Of course, the protrusions 7 can be formed on both the lid portion 80 and the wall portion 61.

The prevention structure 8 for preventing the felt 50 from shifting toward the outside D1*o* in the center line direction is not limited to the lid portion connected to the felt supporting portion 63 by a hinge structure. The prevention structure 8 can be a lid, a trim and the like which are formed separately from the felt supporting portion 63.

Figure 10:
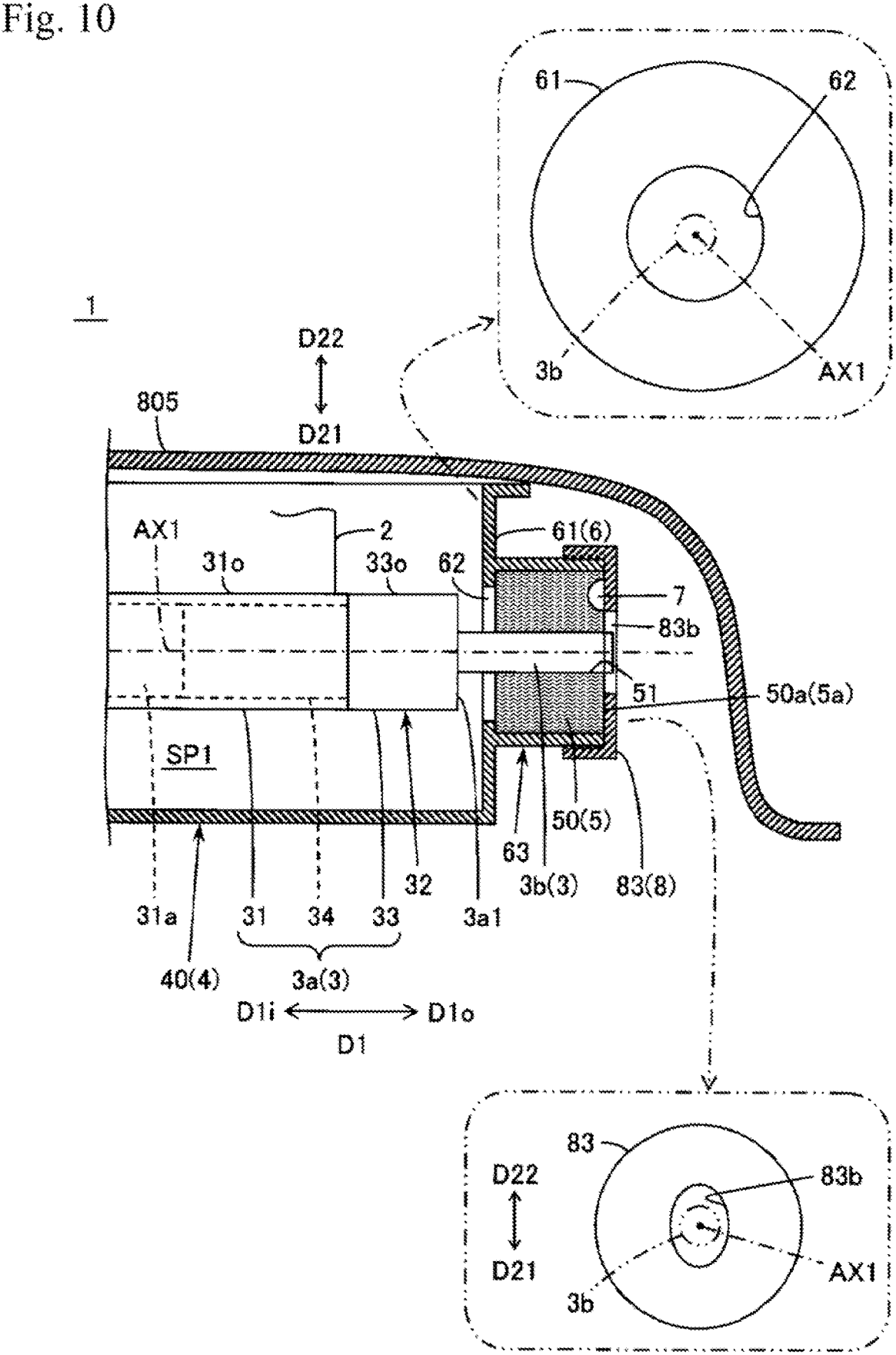
FIG. 10 is a vertical cross-sectional view schematically showing an example of the winding device having a separately formed lid.
Figure 11:
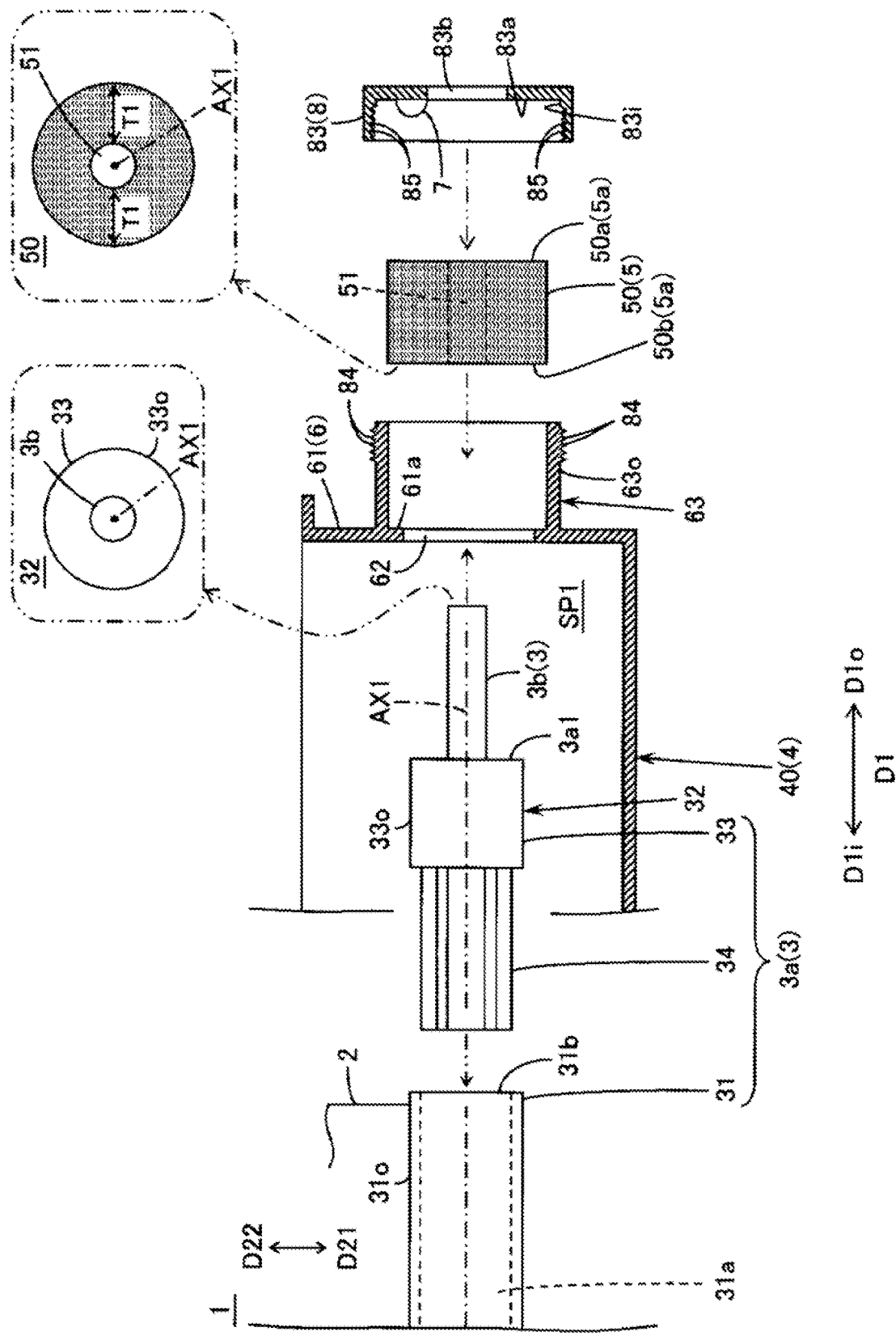
FIG. 11 is an exploded view schematically showing an example of the winding device having the separately formed lid.

FIG. 10 is a vertical cross-sectional view schematically exemplifying a main part of the winding device 1 having a separately formed lid 83. FIG. 10 also shows the drawing of the wall portion 61 viewed from the inside D1*i* in the center line direction, and the drawing of the lid 83 (example of the prevention structure 8) viewed from the outside D1*o* in the center line direction. FIG. 11 is an exploded view schematically exemplifying a main part of the winding device 1 having a separately formed lid 83. FIG. 11 also shows the drawing of the cylindrical body 31 viewed from the outside D1*o* in the center line direction, the drawing of the end member 32 viewed from the inside D1*i* in the center line direction, the drawing of the end member 32 viewed from the outside D1*o* in the center line direction, and the drawing of the felt 50 viewed from the inside D1*i* in the center line direction.

The lid 83 shown in FIGS. 10 and 11 can be attached/detached to/from the felt supporting portion 63. The protrusions 7 are formed on an inner surface 83*a* of the lid 83. A through hole 83*b* for inserting the projecting portion 3*b* of the winding shaft 3 is formed on the lid 83. A plurality of annular grooves 85 is formed on an inner peripheral portion 83*i* of the lid 83 so that each of the annular grooves 85 is formed over one round around the center line AX1. A plurality of annular projected ridges 84 is formed on an outer peripheral portion 63*o* of the felt supporting portion 63 shown in FIGS. 10 and 11 so that each of the projected ridges 84 is formed over one round around the center line AX1. When the lid 83 is installed on the felt supporting portion 63 in which the felt 50 is inserted, the lid 83 is held by the felt supporting portion 63 at a position where the projected ridges 84 are inserted into the grooves 85 after the projected ridges 84 are elastically deformed. Since the plurality of projected ridges 84 and the plurality of grooves 85 are formed, the position of the lid 83 held by the felt supporting portion 63 can be changed in steps in the center line direction D1. Consequently, even when there is a variation in the density, the size and the like of the felt 50, the rigidity of the felt 50 can be appropriately uniformed.

The present technology includes the case where the lid 83 is held by the felt supporting portion 63 only at one position. Also in such a case, the effect of suppressing the abnormal noise can be obtained when vibration is input or when the winding shaft is rotated.

Figure 12:
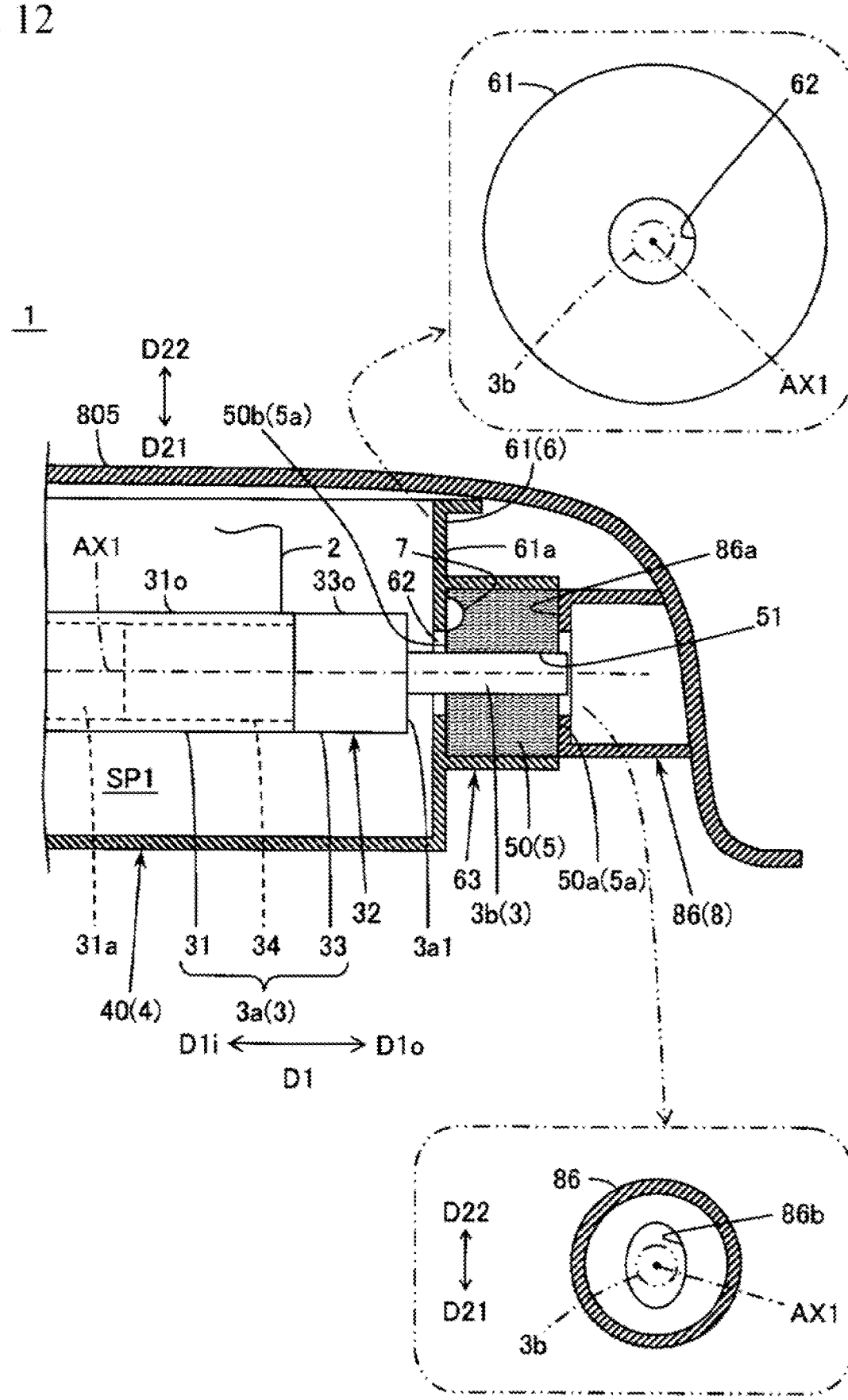
FIG. 12 is a vertical cross-sectional view schematically showing an example of the winding device having a prevention structure formed on a trim.

FIG. 12 is a vertical cross-sectional view schematically exemplifying the winding device 1 having the prevention structure 8 formed on the door trim 805. FIG. 12 also shows the drawing of the wall portion 61 viewed from the inside D1*i* in the center line direction. A protrusion 86 (example of the prevention structure 8) protruded toward the inside D1*i* in the center line direction is formed on the trim 805 shown in FIG. 12. A through hole 86*b* is formed on the protrusion 86 to insert the projecting portion 3*b* of the winding shaft 3 into the through hole 86*b*. An end face 86*a* of the protrusion 86 in the inside D1*i* in the center line direction abuts on the end face 50*a* of the felt 50 at the outside D1*o* in the center line direction to prevent the felt 50 from shifting toward the outside D1*o* in the center line direction. Accordingly, also the present concrete example can prevent the felt 50 from being displaced from the winding shaft 3 toward the outside D1*o* in the center line direction.

Furthermore, the retention structure 6 for keeping the felt 50 apart from the end face 3*a*1 of the body portion 3*a* of the winding shaft is not limited to the wall portion 61. The retention structure 6 can be the enlarged portion 65 formed on the projecting portion 3*b*, for example.

FIG. 13 is a vertical cross-sectional view schematically exemplifying the winding device 1 having the projecting portion 3*b* on which the enlarged portion 65 (example of the retention structure 6) is formed. The enlarged portion 65 is arranged between the end face 3*a*1 of the body portion 3*a* of the winding shaft and the felt 50 in the center line direction D1 and formed on the projecting portion 3*b*. An outer diameter of the enlarged portion 65 is larger than an inner diameter of the hole 51 of the felt 50. Hence, the felt 50 is kept apart from the end face 3*a*1 of the body portion 3*a* of the winding shaft.

The enlarged portion 65 shown in FIG. 13 has a tapered shape gradually increased in diameter from the felt 50 toward the end face 3*a*1 of the body portion 3*a* of the winding shaft. Consequently, when the felt 50 is pressed toward the enlarged portion 65 in the center line direction D1, the portion of the inside D1*i* in the center line direction of the felt 50 is compressed and the rigidity is increased. Thus, the felt 50 is kept apart from the end face 3*a*1 of the body portion 3*a* of the winding shaft.

The shape of the enlarged portion 65 is not limited to a tapered shape. The enlarged portion 65 can be a shape increased stepwisely in diameter from the felt 50 toward the end face 3*a*1 of the body portion 3*a* of the winding shaft, for example.

Furthermore, the fiber assembly 5 rotated together with the winding shaft 3 can be rotatably supported by another shaft.

FIG. 14 is a vertical cross-sectional view schematically exemplifying a main part of the winding device 1 having the felt 50 inserted into the opening 3*d* of the end member 32. FIG. 14 also shows a vertical cross-sectional view of the winding shaft 3 and other components. FIG. 15 is an exploded view schematically exemplifying a main part of the winding device 1 having the felt 50 inserted into the opening 3*d* of the end member 32. FIG. 15 also shows the drawing of the end member 32 viewed from the outside D1*o* in the center line direction, and the drawing of the support shaft 9 viewed from the inside D1*i* in the center line direction.

The projecting portion 3*b* is not provided on the end member 32 shown in FIGS. 14 and 15. The end member 32 has the base portion 33 and the inner engagement portion 34. The outer peripheral surface 33*o* of the base portion 33 is corresponded to the outer peripheral surface 31*o* of the cylindrical body 31. The inner engagement portion 34 is fitted into the opening 31*b* of the end portion of the cylindrical body 31. Accordingly, the cylindrical body 31 and the end member 32 are concrete examples of the winding shaft.

The base portion 33 has a recess 33*a* recessed from a circular opening 3*d* formed on the end face of the outside D1*o* in the center line direction toward the inside D1*i* in the center line direction. The felt 50 inserted from the opening 3*d* is housed in the recess 33*a* and prevented from shifting toward the inside D1*i* in the center line direction. A plurality of annular projected ridges 84 is formed on the outer peripheral surface 33*o* of the base portion 33.

The felt 50 shown in FIGS. 14 and 15 has a through hole 51 along the center line direction D1. The felt 50 is rotatably supported by the support shaft 9 in a state of being housed in the recess 33*a*.

A lid 87 (example of the prevention structure 8) shown in FIGS. 14 and 15 can be attached/detached to/from the base portion 33 of the end member 32. A through hole 87*b* for inserting the support shaft 9 is formed on the lid 87. A plurality of annular grooves 85 is formed on an inner peripheral portion 87*i* of the lid 87 so that each of the annular grooves 85 is formed over one round around the center line AX1. When the lid 87 is installed on the base portion 33 in which the felt 50 is inserted, the lid 87 is held by the base portion 33 at a position where the projected ridges 84 are inserted into the grooves 85 after the projected ridges 84 are elastically deformed. Since the plurality of projected ridges 84 and the plurality of grooves 85 are formed, the position of the lid 87 held by the base portion 33 can be changed in steps in the center line direction D1. Consequently, even when there is a variation in the density, the size and the like of the felt 50, the rigidity of the felt 50 can be appropriately uniformed. Of course, the present technology includes the case where the lid 87 is held by the base portion 33 only at one position. In addition, a male thread can be formed on the outer peripheral surface 33*o* of the base portion 33 instead of the projected ridges 84 and a female thread can be formed on the inner peripheral portion 87*i* of the lid 87 instead of the grooves 85.

The support shaft 9 shown in FIGS. 14 and 15 is integrally formed with the wall portion 61 and projected from the wall 61 toward the inside D1*i* in the center line direction. The support shaft 9 is a fixing shaft having a circular cross section so as to pass through the through hole 87*b* of the lid 87 and the hole 51 of the felt 50 for rotatably fixing the felt 50. The lid 87 is installed on the end member 32 in which the felt 50 is housed, the inner engagement portion 34 of the end member 32 is fitted into the opening 31*b* of the end portion of the cylindrical body 31, and then the support shaft 9 is inserted into the through hole 87*b* of the lid 87 and the hole 51 of the felt 50. Thus, the winding device 1 shown in FIG. 14 is assembled.

Since the above described felt 50 inserted into the opening 3*d* of the winding shaft 3 of the winding device 1 is rotatably supported by the support shaft 9, even if the design considering variation in the size of the case 40 is adopted, vibration applied to the winding device 1 is absorbed by the felt 50. Thus, abnormal noise is suppressed. Accordingly, the present concrete example can also suppress the abnormal noise when vibration is input or when the winding shaft is rotated.

Figure 16:
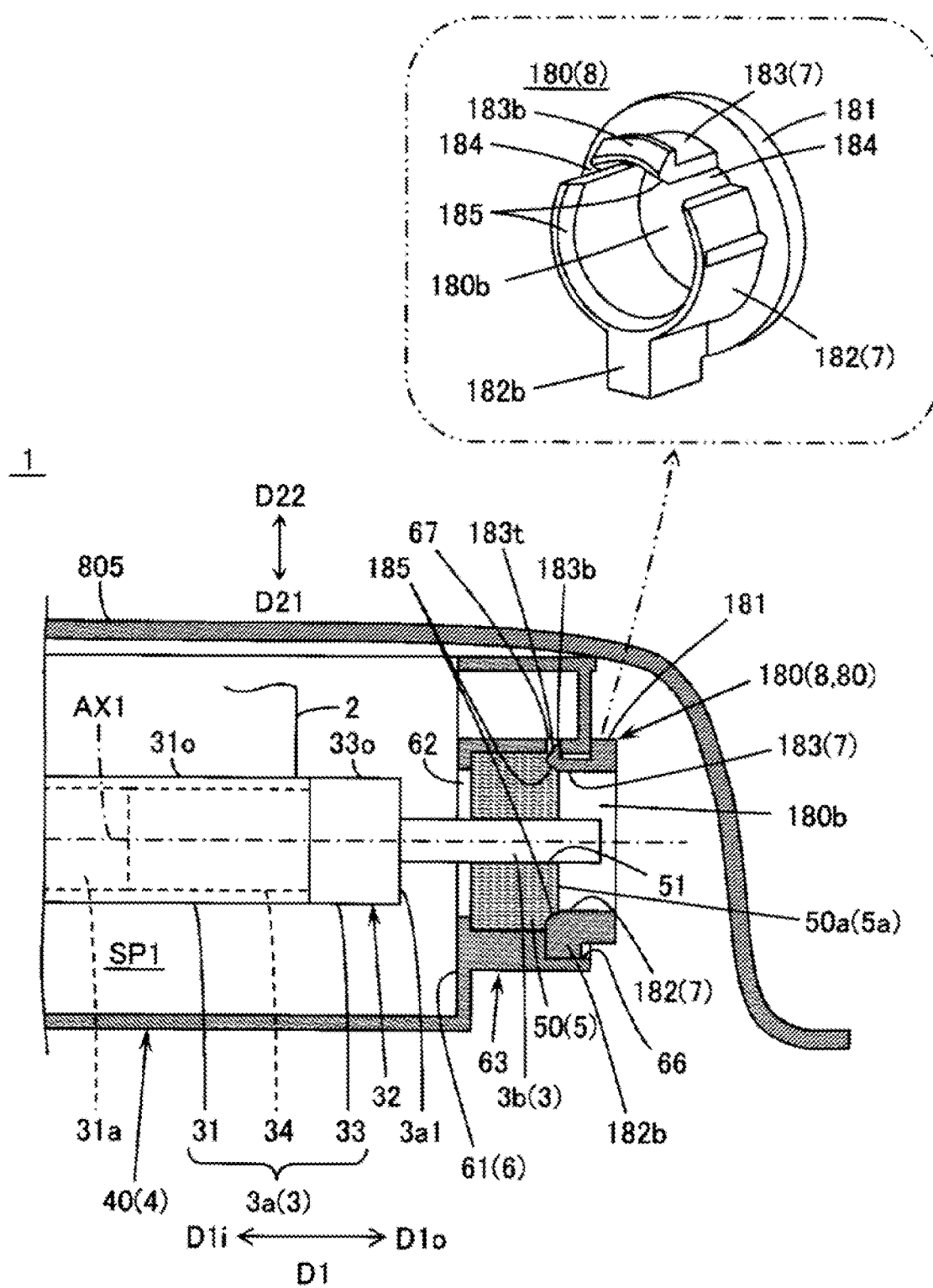
FIG. 16 is a vertical cross-sectional view schematically showing an example of the winding device where a protrusion for pressing an end face of the fiber assembly along an outer periphery of the fiber assembly is formed on the lid portion.
Figure 17:
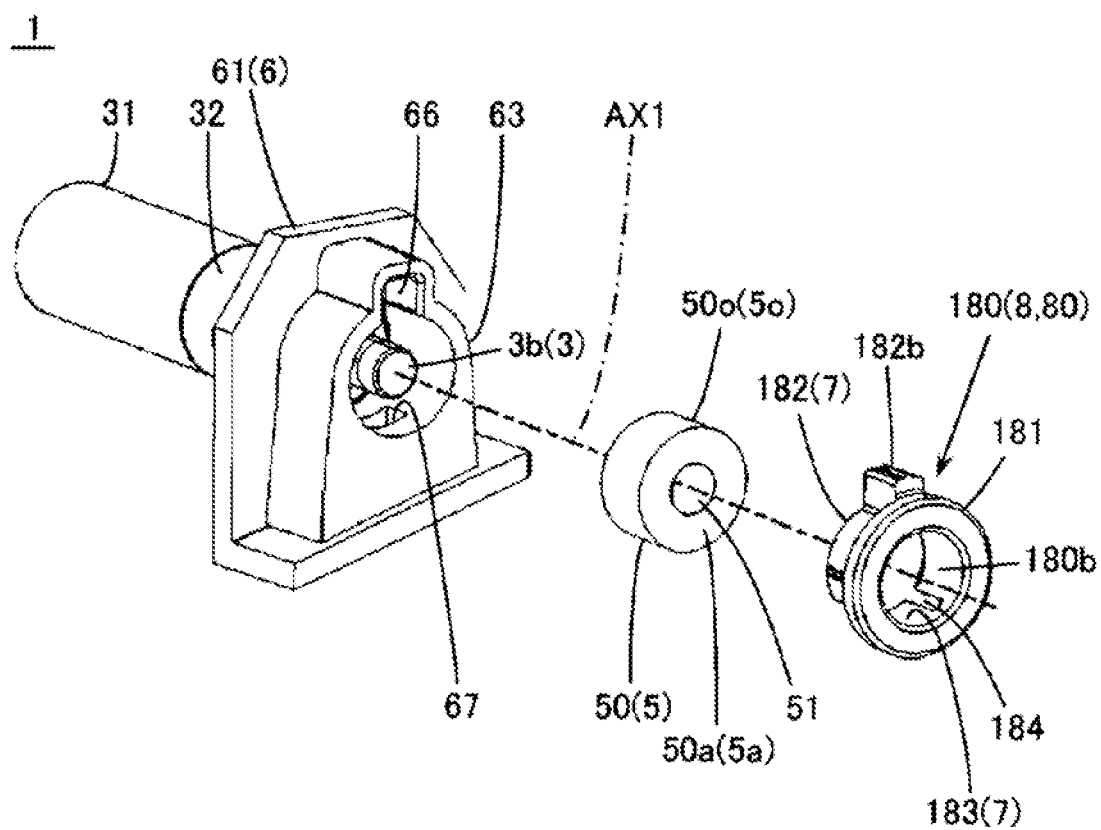
FIG. 17 is an exploded view schematically showing an example of the winding device where the protrusion for pressing the end face of the fiber assembly along the outer periphery of the fiber assembly is formed on the lid portion.

Furthermore, as exemplified in FIGS. 16 and 17, a protrusion 7 can be formed on the lid portion 80 for pressing the end face 5*a* of the fiber assembly 5 along an outer periphery 5*o* of the fiber assembly 5. FIG. 16 is a vertical cross-sectional view schematically exemplifying a main part of the winding device 1 having the above described protrusion 7. FIG. 16 also shows a perspective view of a separately formed cap 180 (example of the prevention structure 8 and the lid portion 80). FIG. 17 is an exploded view schematically exemplifying a main part of the winding device 1 having a cap 180. Note that FIG. 17 is vertically inverted with respect to FIG. 16.

The cap 180 shown in FIGS. 16 and 17 has a flange portion 181, a main annular portion 182 and an anti-come-off portion 183. The cap 180 can be attached/detached to/from the felt supporting portion 63 formed on the wall portion 61. An outer diameter of the flange portion 181 is specified so that the flange portion 181 does not enter in the felt supporting portion 63. Thus, the flange portion 181 abuts on the felt supporting portion 63 in the center line direction D1. The main annular portion 182 and the anti-come-off portion 183 are separated by slits 184, 184 so that the anti-come-off portion 183 is smaller than the main annular portion 182. The main annular portion 182 and the anti-come-off portion 183 are projected from the flange portion 181 toward the inside D1*i* in the center line direction D1 along an outer periphery 50*o* (example of the outer periphery 5*o* of the fiber assembly) of the felt 50. The main annular portion 182 and the anti-come-off portion 183 can be inserted into the felt supporting portion 63. In a state that the flange portion 181 abuts on the felt supporting portion 63, the tip portions of the main annular portion 182 and the anti-come-off portion 183 enter in the felt 50 side from the end face 50*a* of the felt 50. Namely, the main annular portion 182 and the anti-come-off portion 183 are an example of the protrusion 7 that protrudes toward the felt 50 side from the end face 50*a* of the felt 50. A through hole 180*b* is formed on the cap 180 to penetrate from the flange portion 181 to the main annular portion 182 and the anti-come-off portion 183 in the center line direction D1. An inner diameter of the through hole 180*b* is larger than an outer diameter of the projecting portion 3*b* of the winding shaft 3 and smaller than an outer diameter of the felt 50. The projecting portion 3*b* is inserted into the through hole 180*b* so as not to be in contact with the cap 180.

For preventing the rotation of the cap 180, a positioning projection 182*b* having an approximately rectangular parallelepiped shape is formed on the main annular portion 182 so as to be protruded outward in the radial direction around the center line AX1. On the felt supporting portion 63 into which the main annular portion 182 is inserted, a positioning recess 66 having a shape corresponding to the shape of the positioning projection 182*b* is formed. The cap 180 is installed on the felt supporting portion 63 so as not to be rotated around the center line AX1 by inserting the positioning projection 182*b* into the positioning recess 66.

For preventing the cap 180 from coming off, a hook-shaped pawl portion 183*b* is formed on the anti-come-off portion 183 so as to be protruded outward in the radial direction around the center line AX1. The pawl portion 183*b* has a taper portion 183*t* having a chamfered surface at the inside D1*i* in the center line direction D1 and a surface approximately orthogonal to the center line AX1 at the outside D1*o* in the center line direction D1. On the felt supporting portion 63 into which the anti-come-off portion 183 is inserted, an engagement hole 67 is formed so that the pawl portion 183*b* is inserted into the engagement hole 67 in a state that the flange portion 181 abuts on the felt supporting portion 63. The anti-come-off portion 183 is elastically deformed so that the pawl portion 183*b* slides the inner wall of the felt supporting portion 63, and then the pawl portion 183*b* is inserted into the engagement hole 67. Thus, the cap 180 is installed on the felt supporting portion 63 so as not to come off toward the outside D1*o* in the center line direction D1.

At the tip end portions of the main annular portion 182 and the anti-come-off portion 183 which are protruded from the flange portion 181, taper portions 185 having a chamfered surface are formed. The taper portions 185 are formed on the inner surface of the main annular portion 182 and the anti-come-off portion 183 so as to be orientated to the center line AX1. Namely, each of the taper portions 185 has a chamfered surface which is more distant from the center line AX1 to the inside D1*i* as it reaches the center line direction D1. Since the taper portions 185 enter in the felt 50 side from the end face 50*a* of the felt 50, the rigidity of the felt 50 (especially outer peripheral portion) is increased and the durability of the winding device is particularly increased. Thus, the effect of suppressing the abnormal noise can be obtained when vibration is input or when the winding shaft is rotated.

The winding device 1 shown in FIGS. 16 and 17 can be assembled as described below, for example.

First, an operator inserts the felt 50 into the felt supporting portion 63, and inserts the main annular portion 182 and the anti-come-off portion 183 into the felt supporting portion 63 while aligning the positioning projection 182*b* with the positioning recess 66. When the elastically deformed pawl portion 183*b* of the anti-come-off portion 183 is inserted into the engagement hole 67, the felt 50 is fixed to the felt supporting portion 63 by the cap 180 locked to the felt supporting portion 63 in a state that the felt 50 is compressed. Then, the operator inserts the projecting portion 3*b* of the winding shaft 3 into the hole 51 of the felt 50 via the through hole 62 of the wall portion 61. Of course, the order of each process in the operation of the assembly can be arbitrarily changed.

(5) Conclusion

As explained above, according to various embodiments, the present invention can provide a technology capable of suppressing the abnormal noise when vibration is input or when the winding shaft is rotated and so on. Of course, the above-described basic operation and effect can be obtained by the art which includes only the components set forth in the independent claims and without components set forth in the dependent claims.

The present invention can be also implemented by replacing the features disclosed in the above-described embodiments and variation examples with each other or changing the combinations thereof, and the present invention can be also implemented by replacing the conventional features and the features disclosed in the above-described embodiments and variation examples with each other or changing the combinations thereof. The present invention includes these features and the like.

What is claimed is:

1. A winding device, comprising:
   a screen;
   a winding shaft for winding the screen;
   a housing portion for housing the winding shaft; and
   a fiber assembly that supports rotatably an end portion of the winding shaft, wherein
   the winding shaft includes:
     a body portion to which one end of the screen is fixed; and
     a projecting portion that protrudes in a center line direction of the winding shaft from a first end face of the body portion in the center line direction, the projecting portion being supported rotatably by the fiber assembly,
   the winding device further comprises a wall portion that keeps the fiber assembly apart from the first end face of the body portion,
   the wall portion has a through hole through which the projecting portion of the winding shaft extends,
   the wall portion is arranged between the first end face of the body portion and the fiber assembly in the center line direction, such that an entirety of the fiber assembly is positioned on a side of the wall portion opposite from the first end face of the body portion,
   the fiber assembly has a second end face that faces the first end face of the body portion,
   the wall portion is in contact with the second end face of the fiber assembly between the first end face of the body portion and the second end face of the fiber assembly, and
   the winding device further comprises a prevention structure that prevents the fiber assembly form shifting outward, away from the winding shaft, in the center line direction of the winding shaft, wherein the prevention structure has a protrusion that is in contact with the fiber assembly.

* * * * *